United States Patent
Kimura et al.

(10) Patent No.: US 11,840,203 B2
(45) Date of Patent: Dec. 12, 2023

(54) VEHICULAR WASHING DEVICE

(71) Applicant: KOITO MANUFACTURING CO., LTD., Tokyo (JP)

(72) Inventors: Hiroaki Kimura, Shizuoka (JP); Masaru Sakai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 951 days.

(21) Appl. No.: 16/645,175

(22) PCT Filed: Sep. 11, 2018

(86) PCT No.: PCT/JP2018/033686
§ 371 (c)(1),
(2) Date: Mar. 6, 2020

(87) PCT Pub. No.: WO2019/059052
PCT Pub. Date: Mar. 28, 2019

(65) Prior Publication Data
US 2021/0078544 A1 Mar. 18, 2021

(30) Foreign Application Priority Data

Sep. 19, 2017 (JP) ................................ 2017-178862
Sep. 19, 2017 (JP) ................................ 2017-178863
Sep. 19, 2017 (JP) ................................ 2017-178864

(51) Int. Cl.
*F16K 15/14* (2006.01)
*B60S 1/52* (2006.01)
(Continued)

(52) U.S. Cl.
CPC ............... *B60S 1/528* (2013.01); *B60S 1/603* (2013.01); *F16K 15/145* (2013.01); *F16K 17/0493* (2013.01)

(58) Field of Classification Search
CPC .. F16K 15/144; F16K 15/1441; F16K 15/145; F16K 17/0493; B60S 1/528
(Continued)

(56) References Cited

U.S. PATENT DOCUMENTS 2,276,911 A    3/1942   Alward
2,723,678 A   11/1955   Wilson
(Continued)

FOREIGN PATENT DOCUMENTS

CN    104870271 A    8/2015
CN    106537008 A    3/2017
(Continued)

OTHER PUBLICATIONS

International Search Report for PCT/JP2018/033686 dated, Dec. 4, 2018 (PCT/ISA/210).
(Continued)

*Primary Examiner* — P. Macade Nichols
(74) *Attorney, Agent, or Firm* — Sughrue Mion, PLLC

(57) ABSTRACT

A vehicular washing device includes: a nozzle (4); a flow passage forming body (2) of which an internal space is a flow passage of a fluid; and a valve (21) that has a pressing tube part (22) with an axial direction coinciding with a flow direction of the fluid, is elastically deformable in a direction in which the diameter of the pressing tube part changes, and opens and closes the flow passage according to the state of deformation. A first flow passage (2a) and a second flow passage (2b) are formed as the flow passage on opposite sides of the pressing tube part. A shaft (9) with which the pressing tube part is capable of coming into close contact is located inside the valve. The valve deforms elastically according to the magnitude of the pressure of the first flow passage or the pressure of the second flow passage relative to an atmospheric pressure.

14 Claims, 27 Drawing Sheets

(51) Int. Cl.
*B60S 1/60* (2006.01)
*F16K 17/04* (2006.01)

(58) Field of Classification Search
USPC .......................................... 137/850, 854, 847
See application file for complete search history.

(56) References Cited

U.S. PATENT DOCUMENTS

| | | | |
|---|---|---|---|
| 3,298,391 A | | 1/1967 | Savage |
| 5,524,829 A | * | 6/1996 | Keim ..................... F16K 7/075 137/853 |
| 6,460,780 B1 | | 10/2002 | Zimmer et al. |
| 6,463,621 B1 | | 10/2002 | Zimmer et al. |
| 2011/0215173 A1 | * | 9/2011 | Hartnell .................. B60S 1/528 239/284.2 |
| 2011/0272033 A1 | * | 11/2011 | Py ........................ F16K 15/145 137/625.5 |
| 2017/0198817 A1 | | 7/2017 | Yokoe et al. |
| 2021/0078544 A1 | | 3/2021 | Kimura et al. |

FOREIGN PATENT DOCUMENTS

| | | |
|---|---|---|
| CN | 209112137 U | 7/2019 |
| DE | 1106622 B | 5/1961 |
| DE | 19906197 A1 | 8/2000 |
| DE | 19912975 A1 | 9/2000 |
| DE | 19950738 A1 | 5/2001 |
| DE | 203 14 926 U1 | 3/2005 |
| EP | 0 119 174 A1 | 9/1984 |
| EP | 2 939 887 A1 | 11/2015 |
| JP | 28-1062 Y1 | 2/1953 |
| JP | 50-158233 U | 12/1975 |
| JP | 63-201653 U | 12/1988 |
| JP | 1-72452 U | 5/1989 |
| JP | 4-113266 U | 10/1992 |
| JP | 2006-335299 A | 12/2006 |
| JP | 2011-520679 A | 7/2011 |
| JP | 2012-501890 A | 1/2012 |
| JP | 2014-125057 A | 7/2014 |
| WO | 2009/138105 A1 | 11/2009 |
| WO | 2010/028661 A1 | 3/2010 |

OTHER PUBLICATIONS

Partial Supplementary European Search Report dated Oct. 13, 2020 from the European Patent Office in Application No. 18858108.6.
Office Action dated Jul. 12, 2021 in Chinese Application No. 201811096580.3.

* cited by examiner

VEHICULAR WASHING DEVICE

CROSS REFERENCE TO RELATED APPLICATIONS

This application is a National Stage of International Application No. PCT/JP2018/033686 filed Sep. 11, 2018, claiming priority based on Japanese Patent Application No. 2017-178862 filed Sep. 19, 2017, Japanese Patent Application No. 2017-178863 filed Sep. 19, 2017 and Japanese Patent Application No. 2017-178864 filed Sep. 19, 2017.

TECHNICAL FIELD

The present invention relates to a technical field concerning a vehicular washing device that washes an object to be washed by spraying a fluid from a nozzle toward the object to be washed.

BACKGROUND ART

For example, there is a vehicular washing device that is partially protruded through an opening formed in a vehicle body or a bumper to an outside and sprays a fluid from a nozzle to wash an object to be washed, for example, a vehicular lamp, a camera, or a radar.

Some vehicular washing devices have a nozzle that is provided on a leading end side and sprays a fluid and a valve that is disposed in a flow passage of the fluid (e.g., see Patent Literature 1 and Patent Literature 2).

In such a vehicular washing device, the valve is activated when the fluid is supplied to the flow passage, so that the flow passage that has been closed by the valve is opened and the fluid flows toward the nozzle and is sprayed from the nozzle.

CITATION LIST

Patent Literature

Patent Literature 1: Japanese Patent Application Publication No. 2014-125057
Patent Literature 2: Japanese Patent Application Publication No. 2006-335299

SUMMARY OF THE INVENTION

Technical Problem

In the case of a vehicular washing device in which a valve is activated to open a flow passage as described in Patent Literature 1, for example, when a fluid remains between the valve and a nozzle in a cold region or the like, the volume of the fluid may expand due to freezing etc. and the pressure may be applied from the fluid to the valve as a result of expansion of the fluid.

If a pressure is thus applied from the fluid to the valve as a result of freezing etc., the valve will be pressed against other structure, which may hinder the normal operation of the valve or result in breakage of the valve or the other structure.

Therefore, an object of a vehicular washing device of the present invention is to ensure a normal operating state by eliminating malfunction due to expansion of a fluid.

Solution to Problem

First, a vehicular washing device according to the present invention includes: a nozzle that sprays a fluid toward an object to be washed; a flow passage forming body of which an internal space is a flow passage of the fluid; and a valve that has a pressing tube part with an axial direction coinciding with a flow direction of the fluid, is elastically deformable in a direction in which the diameter of the pressing tube part changes, and opens and closes the flow passage according to the state of deformation. A first flow passage and a second flow passage are formed as the flow passage on opposite sides of the pressing tube part. A shaft with which the pressing tube part is capable of coming into close contact is located inside the valve. The valve deforms elastically according to the magnitude of the pressure of the first flow passage or the pressure of the second flow passage relative to an atmospheric pressure.

Thus, since the diameter of the pressing tube part changes to open the flow passage when the pressure of the first flow passage or the pressure of the second flow passage becomes high relative to the atmospheric pressure, no excessive pressure is applied to the valve or structures around the valve.

Second, in the above vehicular washing device according to the present invention, it is desirable that the valve be provided with a first inclined part and a second inclined part that are continuous with both ends of the pressing tube part in the axial direction, and that the diameter of each of the first inclined part and the second inclined part decrease toward the pressing tube part in the axial direction.

Thus, the first inclined part and the second inclined part make it more likely that the pressures of the first flow passage and the second flow passage raised due to the flow of the fluid act on the pressing tube part.

Third, in the above vehicular washing device according to the present invention, it is desirable that an urging spring that urges the pressing tube part in a diameter decreasing direction be provided.

Thus, the pressing tube part is brought into close contact with the shaft also by the urging force of the urging spring.

Fourth, in the above vehicular washing device according to the present invention, it is desirable that a leaf spring wound around an outer peripheral surface of the pressing tube part be used as the urging spring.

Thus, the pressing tube part is brought into close contact with the shaft by the urging force of the leaf spring wound around the outer peripheral surface of the pressing tube part.

Fifth, in the above vehicular washing device according to the present invention, it is desirable that the shaft be integrally formed in the flow passage forming body.

Thus, there is no need to provide a dedicated shaft with which the valve comes into close contact.

Sixth, another vehicular washing device according to the present invention includes a nozzle that sprays a fluid toward an object to be washed, a joint of which an internal space is a flow passage of the fluid and to which a supply pipe is coupled, the supply pipe being supplied with the fluid, and a valve that opens and closes the flow passage, and the valve is disposed inside the joint.

Thus, the supply pipe is coupled to the joint and the valve is disposed inside the joint.

Seventh, in the above other vehicular washing device according to the present invention, it is desirable that a nozzle holder that holds the nozzle be provided, and that the joint be attachable to and detachable from the nozzle holder.

Thus, there is no other member between the nozzle holder and the joint.

Eighth, in the above other vehicular washing device according to the present invention, it is desirable that the joint be provided with a coupling tube part that is coupled to the nozzle holder and a pipe coupling part to which the supply pipe is coupled, and that an axial direction of the coupling tube part and an axial direction of the pipe coupling part be different directions.

Thus, a flow path of the fluid flowing from the supply pipe toward the nozzle through the pipe coupling part and the coupling tube part is a bent flow path.

Ninth, in the above other vehicular washing device according to the present invention, it is desirable that the joint be provided with an elastically deformable coupling protrusion, and that the joint be attached to the nozzle holder as a portion of the coupling protrusion is engaged with the nozzle holder.

Thus, the joint is attached to or detached from the nozzle holder as the coupling protrusion is elastically deformed or elastically restored.

Tenth, in the above other vehicular washing device according to the present invention, it is desirable that an urging spring that urges the valve in a direction of closing the flow passage and is located inside the valve be provided, and that the fluid flow outside the valve.

Thus, the flow of the fluid is not hindered by the urging spring.

Eleventh, yet another vehicular washing device according to the present invention includes a nozzle that sprays a fluid toward an object to be washed and a flow passage forming body of which an internal space is a flow passage of the fluid. The flow passage has a first direction in which the fluid heads for the nozzle and a second direction that is the opposite direction from the first direction. The vehicular washing device includes: a valve seat that has an opening and is movable in the first direction and the second direction; a valve that is movable in the first direction and the second direction and opens the opening by moving in the first direction under the pressure of the fluid flowing in the first direction; a first spring that urges the valve seat in the first direction and presses the valve seat against the valve; and a second spring that urges the valve in the second direction and closes the opening with the valve.

Thus, the valve seat and the valve are urged in directions toward each other by the first spring and the second spring, and the valve is moved in the first direction or the second direction according to the state of the pressure applied to the valve, so that a load on the valve due to expansion of the fluid is reduced.

Twelfth, in the above yet other vehicular washing device according to the present invention, it is desirable that the urging force of the first spring be larger than the urging force of the second spring.

Thus, the valve seat is always retained in a predetermined position when the fluid is not frozen.

Thirteenth, in the above yet other vehicular washing device according to the present invention, it is desirable that an O-ring that is located around the valve and restricts a flow of the fluid from the outer peripheral side of the valve seat toward the outer peripheral side of the valve be provided.

Thus, the fluid does not flow from the outer peripheral side of the valve seat to the outer peripheral side of the valve when the fluid flows in the first direction.

Fourteenth, in the above yet other vehicular washing device according to the present invention, it is desirable that a flow groove extending in a flow direction of the fluid be formed in an inner surface of the flow passage forming body, on the outer peripheral side of the valve seat.

Thus, the fluid flows through the flow groove from the outer peripheral side of the valve when the valve is moved in the second direction as a result of expansion of the fluid.

Fifteenth, in the above yet other vehicular washing device according to the present invention, it is desirable that coil springs be used as the first spring and the second spring.

Thus, the inside of each of the first spring and the second spring can be used as a flow space for the fluid.

Advantageous Effects of Invention

In the present invention, since the diameter of the pressing tube part changes to open the flow passage when the pressure of the first flow passage or the pressure of the second flow passage becomes high relative to an atmospheric pressure, no excessive pressure is applied to the valve or structures around the valve. Thus, malfunction due to expansion of the fluid can be eliminated to ensure a normal operating state of the vehicular washing device.

BRIEF DESCRIPTION OF THE DRAWINGS

FIG. 1 is a perspective view of the vehicular washing device.

FIG. 12 is a perspective view of the vehicular washing device.

FIG. 15 is a side view of the vehicular washing device.

FIG. 19 is a perspective view of the vehicular washing device.

FIG. 21 is a perspective view of the vehicular washing device.

FIG. 26 is a perspective view of the vehicular washing device.

FIG. 31 is a perspective view of the vehicular washing device.

MODES FOR CARRYING OUT THE INVENTION

Embodiments of vehicular washing devices of the present invention will be described below with reference to the accompanying drawings.

The vehicular washing devices to be shown below can be widely applied to vehicular washing devices for objects to be washed that are parts provided in a vehicle, including a vehicle body, a window, and a mirror, in addition to objects to be washed such as a vehicular lamp, a camera, and a radar.

First, a vehicular washing device 1 according to a first embodiment will be described (see FIG. 1 through FIG. 11).

In the vehicular washing device according to the first embodiment shown below, a fluid flows as a valve formed in a tubular shape deforms. In the following description, frontward, rearward, upward, downward, leftward, and rightward directions will be indicated by setting an axial direction of the valve to an up-down direction. However, the frontward, rearward, upward, downward, leftward, and rightward directions indicated below are for the convenience of description, and implementation of the present invention is not limited to these directions.

Figure 1:
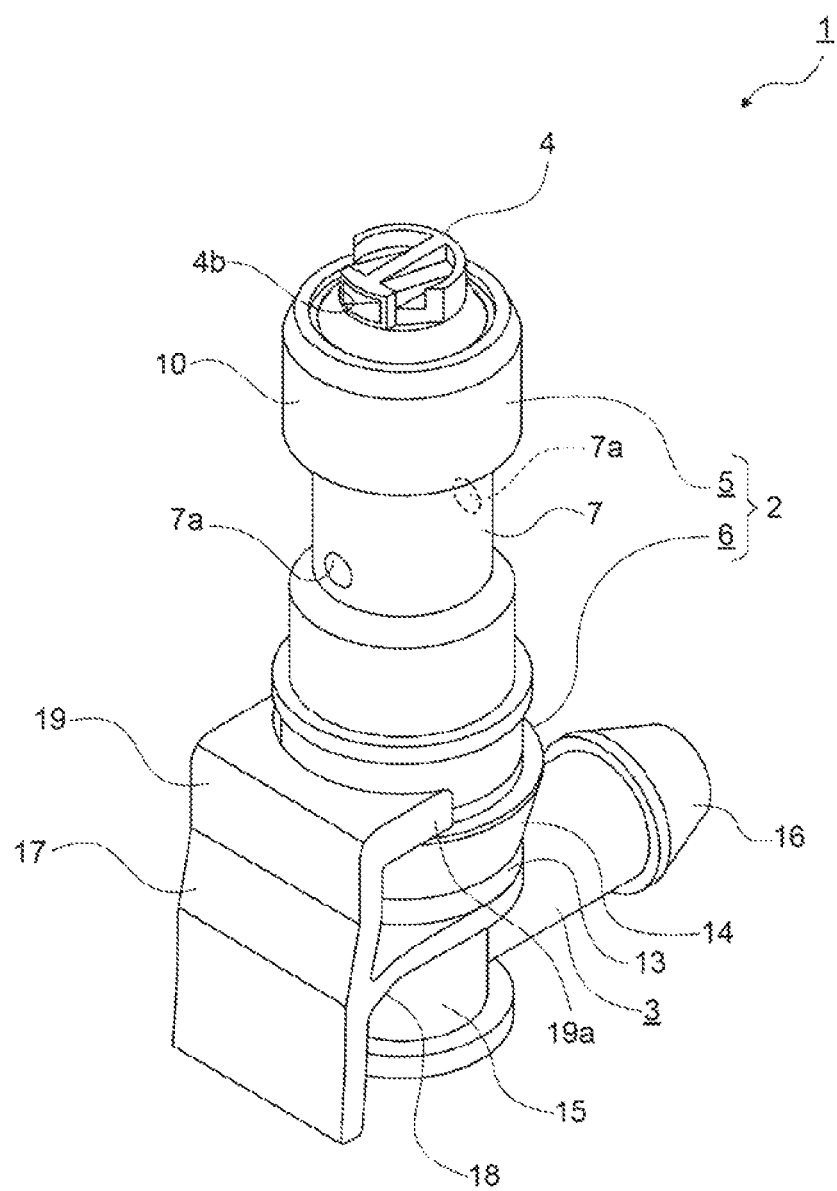
FIG. 1 Showing a first embodiment of a vehicular washing device of the present invention along with FIG. 2 through FIG. 11.
Figure 2:
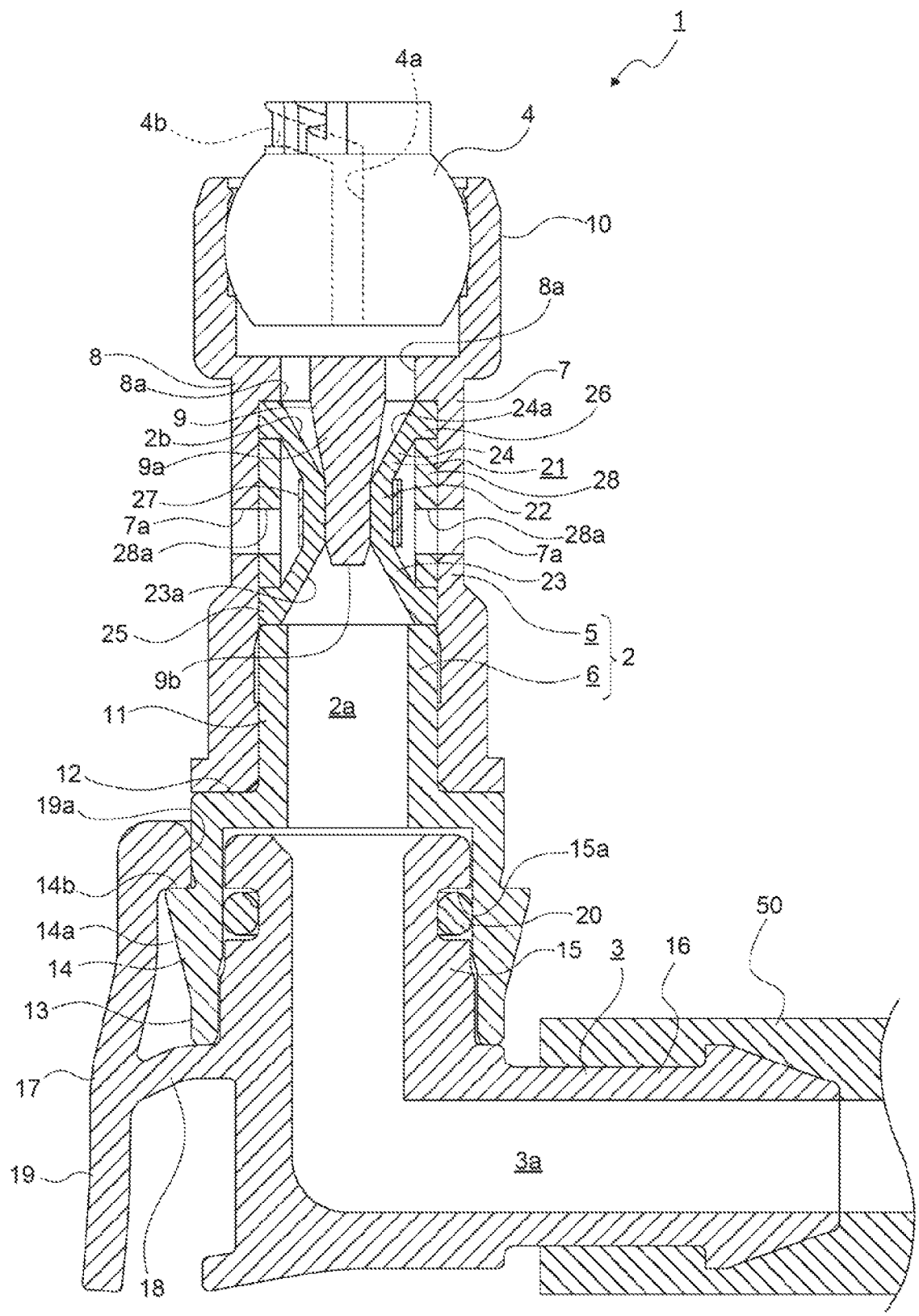
FIG. 2 is a sectional view of the vehicular washing device.
Figure 3:
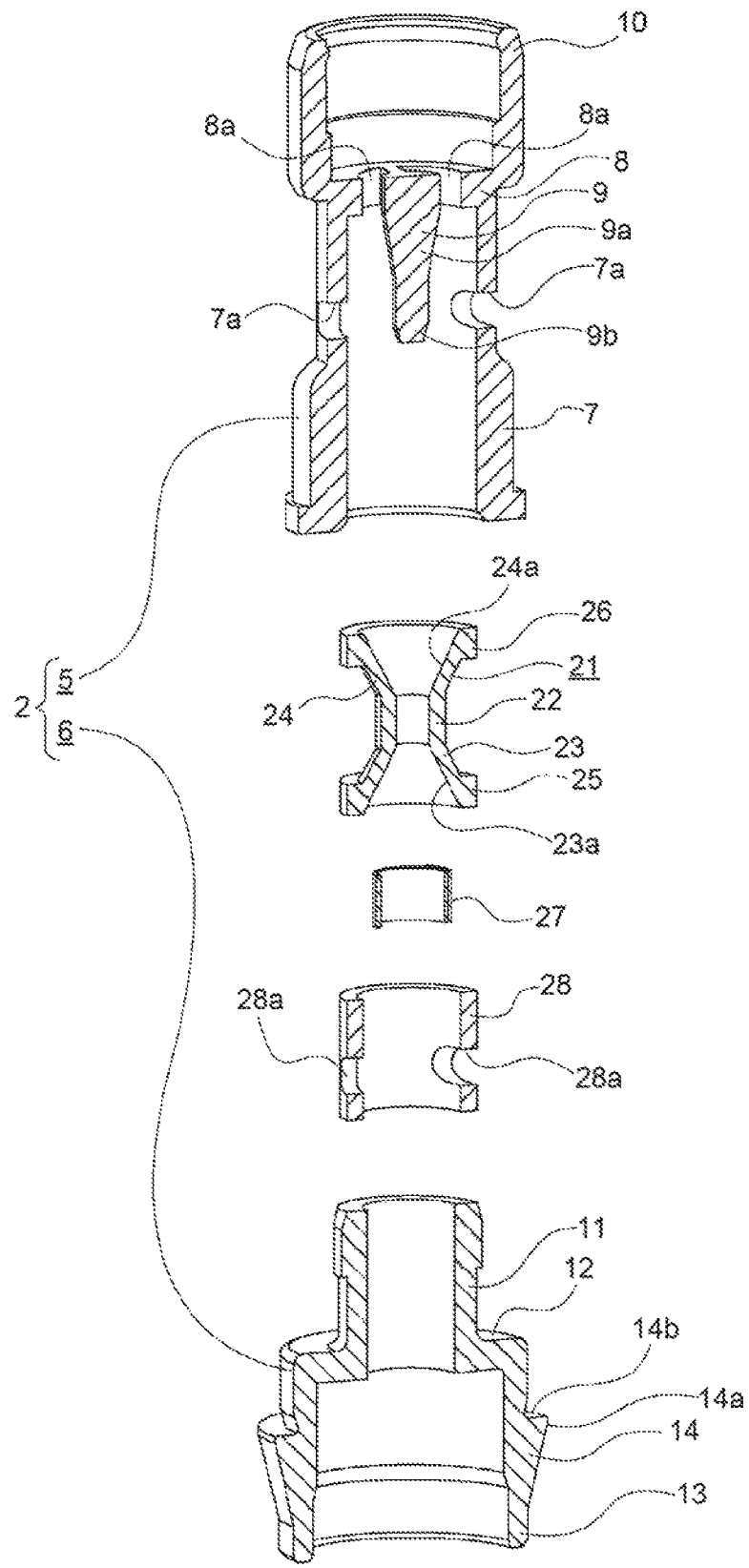
FIG. 3 is an exploded perspective view showing an internal structure etc. as sectioned.

The vehicular washing device 1 has a flow passage forming body 2, a joint 3, and a nozzle 4 (see FIG. 1 through FIG. 3).

The flow passage forming body 2 is formed by connecting a nozzle holder 5 and a coupling member 6 to each other.

The nozzle holder 5 has a substantially cylindrical tubular part 7 with an axial direction oriented in the up-down direction, a substantially disc-shaped partition plate 8 that closes an upper-side opening of the tubular part 7, a shaft 9 that protrudes downward from a central portion of the partition plate 8, and a substantially cylindrical nozzle holding part 10 that protrudes upward from an outer peripheral portion of the partition plate 8. Air circulation holes 7a, 7a are formed on opposite sides of the tubular part 7 in a circumferential direction. Pass-through holes 8a, 8a, . . . are formed in the partition plate 8. The nozzle holder 5 is provided with a mounting protrusion (not shown) for a vehicle body or a bumper, for example.

The shaft 9 is composed of a diameter changing part 9a which is continuous with the partition plate 8 and of which the diameter decreases downward, and a pressed part 9b which protrudes downward from the diameter changing part 9a and of which the diameter is substantially constant. As a part of the flow passage forming body 2, the shaft 9 is integrally formed with the tubular part 7 and the partition plate 8.

The coupling member 6 has a substantially cylindrical small-diameter part 11, a substantially ring-shaped intermediate part 12, and a substantially cylindrical large-diameter part 13. The small-diameter part 11 protrudes upward from an inner peripheral portion of the intermediate part 12, and the large-diameter part 13 protrudes downward from an outer peripheral portion of the intermediate part 12. The diameter of the small-diameter part 11 is smaller than the diameter of the large-diameter part 13.

The coupling member 6 is provided with an annular coupling engaging portion 14 that protrudes outward from the large-diameter part 13. The coupling engaging portion 14 has an inclined surface 14a that is an outer surface shifting outward while extending upward, and a ring-shaped engaging surface 14b that is continuous with an upper end of the inclined surface 14a and faces upward.

The coupling member 6 is connected to the nozzle holder 5 with an upper surface of the intermediate part 12 butted against a lower surface of the tubular part 7 from below.

The nozzle 4 has a spherical outer peripheral surface except for an upper end portion, and has a discharge space 4a formed inside. A discharge opening 4b communicating with the discharge space 4a is formed in the upper end portion of the nozzle 4.

The nozzle 4 is press-fitted in the nozzle holding part 10 of the nozzle holder 5 in a nested state. The nozzle 4 may be rotatable in an arbitrary direction relatively to the nozzle holding part 10. In a state where the nozzle 4 is held by the nozzle holding part 10, the discharge space 4a communicates with an internal space of the nozzle holding part 10.

The joint 3 is coupled to the coupling member 6 of the flow passage forming body 2. The joint 3 is attachable to and detachable from the coupling member 6. An internal space of the joint 3 is formed as a flow passage 3a. The joint 3 has a coupling tube part 15 extending in the up-down direction, a pipe coupling part 16 protruding rearward from a lower end portion of the coupling tube part 15, and a coupling protrusion 17 continuous with the coupling tube part 15.

A ring insertion groove 15a extending in a circumferential direction is formed in the coupling tube part 15, at a position near an upper end. An internal space of the pipe coupling part 16 communicates with an internal space of the coupling tube part 15.

The coupling protrusion 17 has an arm 18 protruding frontward from the coupling tube part 15 and an acting part 19 continuous with a leading end portion of the arm 18, and a central portion of the acting part 19 in the up-down direction is continuous with the arm 18. An engaging portion 19a protruding toward the coupling tube part 15 is provided at an upper end portion of the acting part 19. The coupling protrusion 17 is elastically deformable in directions in which upper and lower end portions of the acting part 19 are moved closer to and away from the coupling tube part 15.

A sealing ring 20 made of rubber etc. is inserted in the ring insertion groove 15a of the coupling tube part 15.

The joint 3 is coupled to the coupling member 6 from below, and coupling of the joint 3 to the coupling member 6 is done by inserting the coupling tube part 15 into the large-diameter part 13 of the coupling member 6. To insert the coupling tube part 15 into the large-diameter part 13, a portion of the large-diameter part 13 is inserted between the coupling tube part 15 and the acting part 19, and the engaging portion 19a is slid over the inclined surface 14a of the coupling engaging portion 14. When the engaging portion 19a is slid over the inclined surface 14a, the coupling protrusion 17 is elastically deformed in a direction in which the engaging portion 19a is moved away from the coupling tube part 15. When a lower edge of the engaging portion 19a reaches an upper edge of the inclined surface 14a, the coupling protrusion 17 is elastically restored and the engaging portion 19a is engaged with the engaging surface 14b.

The joint 3 is coupled to the coupling member 6 as the coupling tube part 15 is inserted into the large-diameter part 13 and the engaging portion 19a is engaged with the engaging surface 14b. In a state where the joint 3 is coupled to the coupling member 6, sealing between the coupling tube part 15 and the large-diameter part 13 is provided by the sealing ring 20.

Thus, since coupling of the joint 3 to the flow passage forming body 2 can be done in one step of inserting the coupling tube part 15 into the large-diameter part 13 from below, the work efficiency of the work of coupling the joint 3 to the flow passage forming body 2 can be increased.

On the other hand, the joint 3 can be removed from the flow passage forming body 2 by elastically deforming the coupling protrusion 17 so as to disengage the engaging portion 19a from the engaging surface 14b and pulling the coupling tube part 15 downward out of the large-diameter part 13. Here, the coupling protrusion 17 can be elastically deformed by pressing the lower end portion of the acting part 19 toward the coupling tube part 15, which makes it easy to remove the joint 3 from the flow passage forming body 2.

A supply pipe 50, such as a hose, is coupled to the pipe coupling part 16 of the joint 3. A fluid, such as washing water or a washing liquid, is supplied from a supply tank (not shown) to the supply pipe 50, and the fluid supplied flows from the flow passage 3a of the joint 3 toward the nozzle 4 through an internal space of the flow passage forming body 2.

A valve 21 is disposed inside the flow passage forming body 2. The valve 21 is made of an elastically deformable rubber material etc. and disposed in a space between the partition plate 8 of the nozzle holder 5 and the coupling member 6.

The valve 21 has a cylindrical pressing tube part 22 with an axial direction oriented in the up-down direction, a first inclined part 23 which is continuous with a lower end of the pressing tube part 22 and of which the diameter increases downward, a second inclined part 24 which is continuous with an upper end of the pressing tube part 22 and of which the diameter increases upward, a flange-shaped first pressed part 25 projecting outward from a lower end portion of the first inclined part 23, and a flange-shaped second pressed part 26 projecting outward from an upper end portion of the second inclined part 24.

Figure 4:
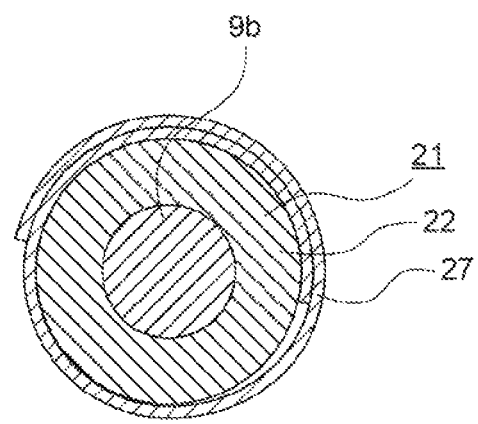
FIG. 4 is a sectional view showing a state before a pressing tube part of a valve is elastically deformed in a diameter increasing direction.
Figure 5:
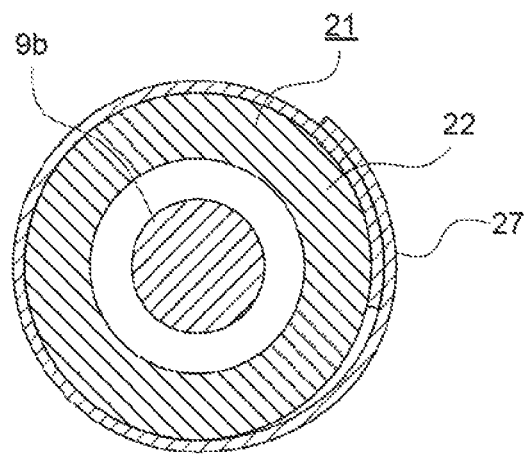
FIG. 5 is a sectional view showing a state where the pressing tube part of the valve is elastically deformed in the diameter increasing direction.
Figure 6:
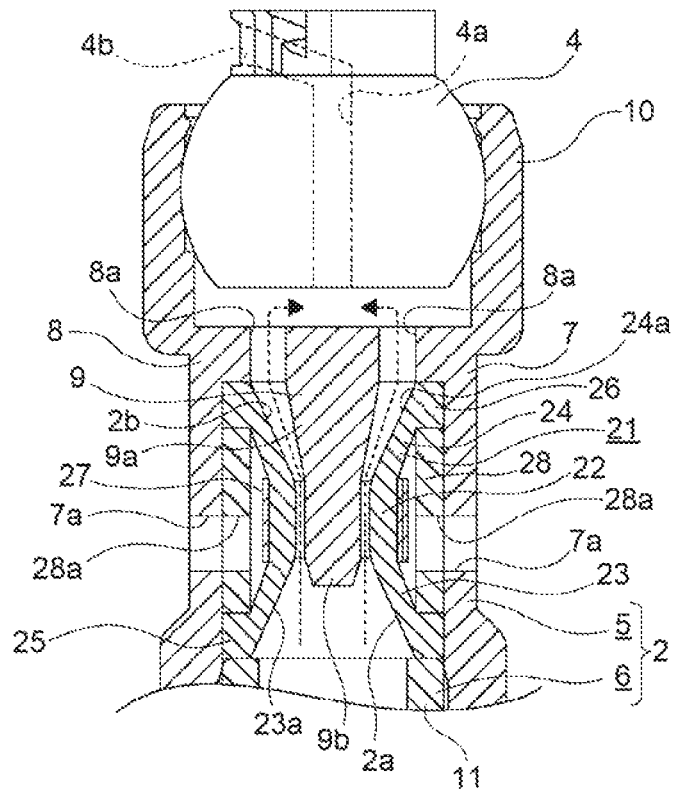
FIG. 6 is a sectional view showing a state where a fluid flows toward a nozzle and the valve is activated.
Figure 7:
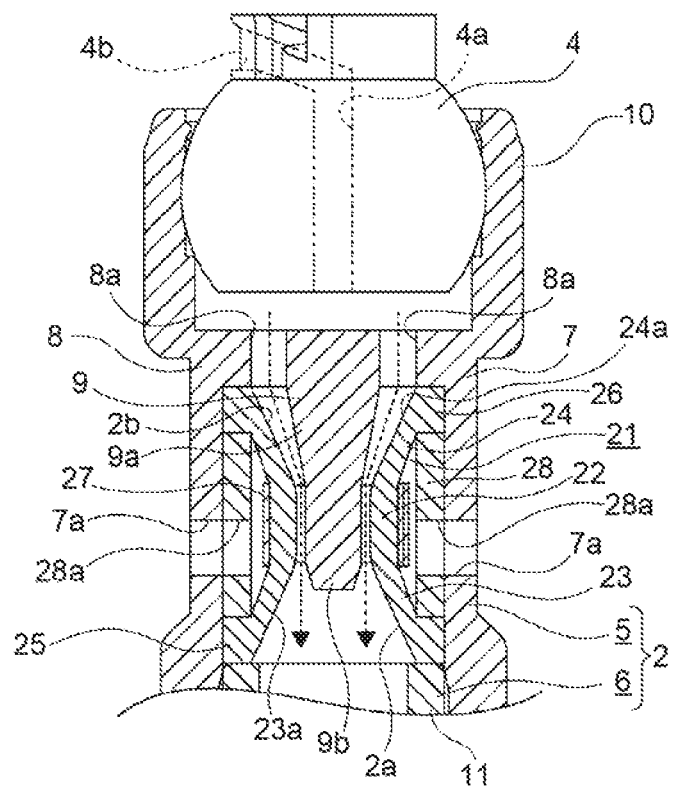
FIG. 7 is a sectional view showing a state where the fluid expands and the valve is activated.

The valve 21 is elastically deformable in a direction in which the diameter of the pressing tube part 22 changes, and when a force in a diameter decreasing direction that is larger than a force in a diameter increasing direction acts on the pressing tube part 22, the pressing tube part 22 is brought into close contact with the pressed part 9b of the shaft 9 (see FIG. 4).

In a state where the valve 21 is disposed inside the flow passage forming body 2, the internal space of the flow passage forming body 2 is divided into a first flow passage 2a on a lower side of the pressing tube part 22 and a second flow passage 2b on an upper side of the pressing tube part 22 (see FIG. 2).

An urging spring 27 is wound around the pressing tube part 22 of the valve 21. The urging spring 27 urges the pressing tube part 22 in the diameter decreasing direction, and for example, a leaf spring having a substantially cylindrical shape is used as the urging spring 27.

A spacer 28 is disposed inside the flow passage forming body 2. The spacer 28 has a cylindrical shape and has circulation holes 28a, 28a on opposite sides in a circumferential direction. The spacer 28 is disposed with an outer peripheral surface in close contact with an inner peripheral surface of the tubular part 7 of the nozzle holder 5, and the circulation holes 28a, 28a coincide respectively with the air circulation holes 7a, 7a of the tubular part 7.

As the spacer 28 is disposed inside the flow passage forming body 2, the first pressed part 25 of the valve 21 is pressed from above and below by a lower surface of the spacer 28 and an upper surface of the coupling member 6 while the second pressed part 26 thereof is pressed from above and below by a lower surface of the partition plate 8 and an upper surface of the spacer 28.

In the vehicular washing device 1 thus configured, when the fluid is supplied from the supply tank to the flow passage 3a of the joint 3 through the supply pipe 50, the fluid flows from the flow passage 3a to the first flow passage 2a of the flow passage forming body 2 and heads for the valve 21.

Here, outside air is taken into an outer peripheral side of the valve 21 inside the flow passage forming body 2 through the air circulation holes 7a, 7a of the tubular part 7 and the circulation holes 28a, 28a of the spacer 28. As the fluid heads for the valve 21, the pressure (internal pressure) of the first flow passage 2a becomes higher than an atmospheric pressure. As a result, the valve 21 is elastically deformed in the diameter increasing direction of the pressing tube part 22 against the urging force of the urging spring 27 (see FIG. 5 and FIG. 6), creating a gap between an inner peripheral surface of the pressing tube part 22 and an outer peripheral surface of the pressed part 9b of the shaft 9, through which the fluid flows from the first flow passage 2a toward the second flow passage 2b.

When the fluid flows through the first flow passage 2a and heads for the pressing tube part 22 of the valve 21, the fluid is guided by an inclined surface 23a on an inner side of the first inclined part 23 of the valve 21 and flows toward the outer peripheral side of the pressed part 9b of the shaft 9.

Thus, the first inclined part 23 makes it more likely that the pressure (internal pressure) of the first flow passage 2a raised due to the flow of the fluid acts on the pressing tube part 22, so that deformation of the pressing tube part 22 in the direction in which the diameter changes can be achieved more reliably by a simple configuration.

The fluid having flowed toward the second flow passage 2b flows into the discharge space 4a of the nozzle 4 and is sprayed through the discharge opening 4b toward an object to be washed, such as a vehicular lamp, and the object to be washed is washed with the sprayed fluid.

When supply of the fluid from the supply tank stops, the pressure inside the flow passage forming body 2 decreases and the valve 21 and the urging spring 27 are elastically restored, so that the pressing tube part 22 is brought into close contact with the pressed part 9b of the shaft 9 (see FIG. 2) and spraying of the fluid from the nozzle 4 stops. The pressing tube part 22 is brought into close contact with the pressed part 9b not only by elastic restoration of the valve 21 due to the difference between the pressure inside the flow passage forming body 2 and the atmospheric pressure but also by the urging force exerted by the urging spring 27 on the pressing tube part 22.

Thus, the vehicular washing device 1 is provided with the urging spring 27 that urges the pressing tube part 22 in the diameter decreasing direction. Therefore, the pressing tube part 22 is brought into close contact with the shaft 9 also by the urging force of the urging spring 27, which makes it possible to prevent unintended spraying of the fluid from the nozzle 4 by reliably bringing the pressing tube part 22 into close contact with the shaft 9 when washing is not performed, as well as to easily control the pressures of the first flow passage 2a and the second flow passage 2b.

The leaf spring wound around the outer peripheral surface of the pressing tube part 22 is used as the urging spring 27. Thus, since the pressing tube part 22 is brought into close contact with the shaft 9 by the urging force of the leaf spring wound around the outer peripheral surface of the pressing tube part 22, the urging spring 27 takes a smaller installation space and downsizing of the vehicular washing device 1 is ensured. At the same time, it is possible to prevent unintended spraying of the fluid from the nozzle 4 by reliably bringing the pressing tube part 22 into close contact with the shaft 9 when washing is not performed, as well as to easily control the pressures of the first flow passage 2a and the second flow passage 2b.

On the other hand, the fluid may remain in a space from the nozzle 4 to the valve 21 in the vehicular washing device 1, and the remaining fluid may expand due to freezing etc. in a cold region or the like. If the fluid thus expands, the pressure (internal pressure) of the second flow passage 2b becomes higher than the atmospheric pressure, and the valve 21 is elastically deformed in the diameter increasing direction of the pressing tube part 22 against the urging force of the urging spring 27 (see FIG. 7), creating a gap between the inner peripheral surface of the pressing tube part 22 and the outer peripheral surface of the pressed part 9b of the shaft 9, through which the fluid can flow from the second flow passage 2b toward the first flow passage 2a. Here, the fluid is guided by an inclined surface 24a on an inner side of the second inclined part 24 of the valve 21 and can flow toward the outer peripheral side of the pressed part 9b of the shaft 9.

Thus, when the fluid expands, a gap is created between the inner peripheral surface of the pressing tube part 22 and the outer peripheral surface of the pressed part 9b of the shaft 9, and the fluid can flow through this gap from the second flow passage 2b toward the first flow passage 2a. As a result, the pressure on the parts of the valve 21 and the flow passage forming body 2 decreases, so that damage or breakage of the valve 21 and the flow passage forming body 2 does not occur.

When the fluid heads from the second flow passage 2b toward the pressing tube part 22 of the valve 21, the fluid is guided by the inclined surface 24a on the inner side of the second inclined part 24 of the valve 21 and flows toward the outer peripheral side of the pressed part 9b of the shaft 9.

Thus, the second inclined part 24 makes it more likely that the pressure (internal pressure) of the second flow passage 2b raised due to the flow of the fluid acts on the pressing tube part 22, so that deformation of the pressing tube part 22 in the direction in which the diameter changes can be achieved more reliably by a simple configuration.

When freezing etc. of the fluid disappears and the pressure of the second flow passage 2b decreases, the valve 21 and the urging spring 27 are elastically restored and the pressing tube part 22 returns to its original state of being in close contact with the pressed part 9b of the shaft 9 (see FIG. 2).

Figure 8:
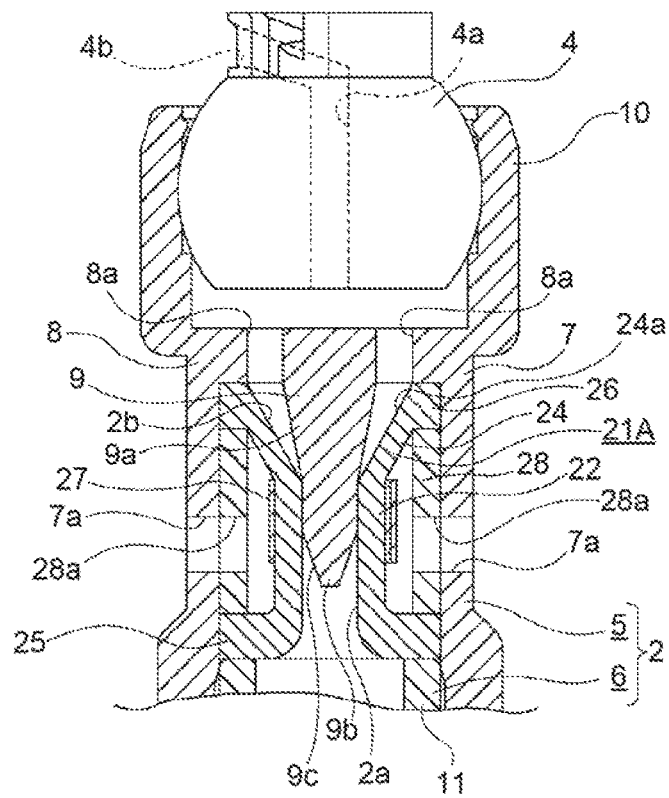
FIG. 8 is a sectional view showing another example of the valve.

While the valve 21 provided with the second inclined part 24 and the first inclined part 23 continuous respectively with upper and lower sides of the pressing tube part 22 has been described above as an example, a valve 21A provided with one of the first inclined part 23 and the second inclined part 24 can be used instead of the valve 21 (see FIG. 8). In this case, it is desirable that an outer peripheral surface of at least a lower end portion of the shaft 9 be formed as an inclined outer peripheral surface 9c that is inclined so as to shift inward while extending downward.

If the inclined outer peripheral surface 9c is thus formed in the shaft 9, the fluid is guided by the inclined outer peripheral surface 9c when flowing through the first flow passage 2a and heading for the pressing tube part 22 of the valve 21. Thus, the inclined outer peripheral surface 9c makes it more likely that the pressure (internal pressure) of the first flow passage 2a raised due to the flow of the fluid acts on the pressing tube part 22.

Figure 9:
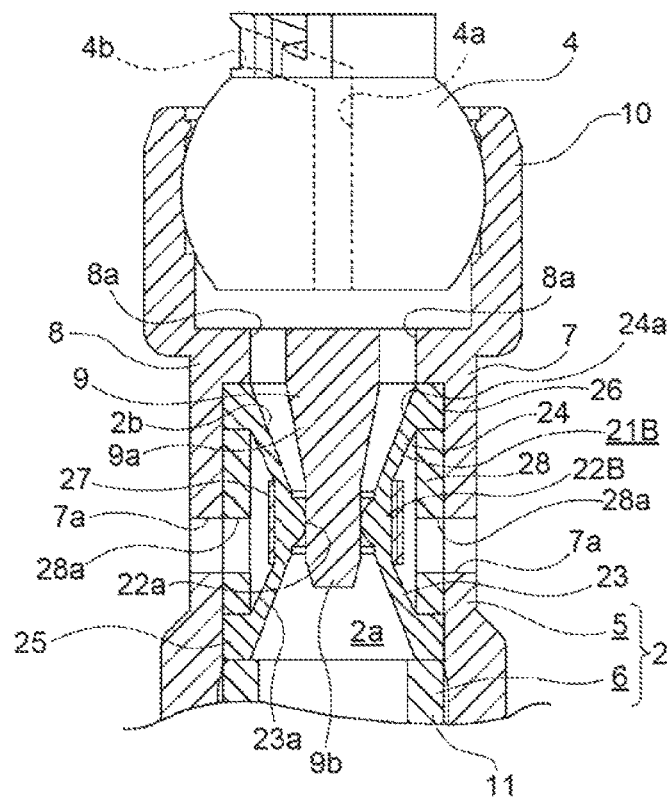
FIG. 9 is a sectional view showing yet another example of the valve.

Instead of the valve 21, a valve 21B provided with a pressing tube part 22B that has an annular pressing protrusion 22a protruding inward may be used (see FIG. 9). For example, the pressing protrusion 22a has a cross-sectional shape that is substantially semicircular and convex toward the pressed part 9b.

If the valve 21B having the pressing protrusion 22a with such a shape is used, it becomes more likely that the fluid enters between the pressed part 9b and the pressing tube part 22B, and that the pressing tube part 22B deforms elastically in the diameter increasing direction when the pressure (internal pressure) of the first flow passage 2a or the second flow passage 2b becomes higher than the atmospheric pressure. Thus, the reliability of the operation of the valve 21B can be enhanced.

Figure 10:
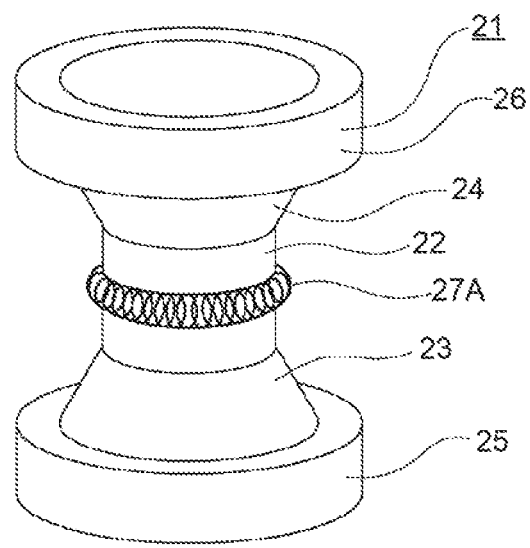
FIG. 10 is a perspective view showing another example of an urging spring.

Further, while the example in which the urging spring 27 that is a leaf spring is used has been shown above, an urging spring 27A that is a coil spring wound around the pressing tube part 22 may be used instead of the urging spring 27 (see FIG. 10).

Figure 11:
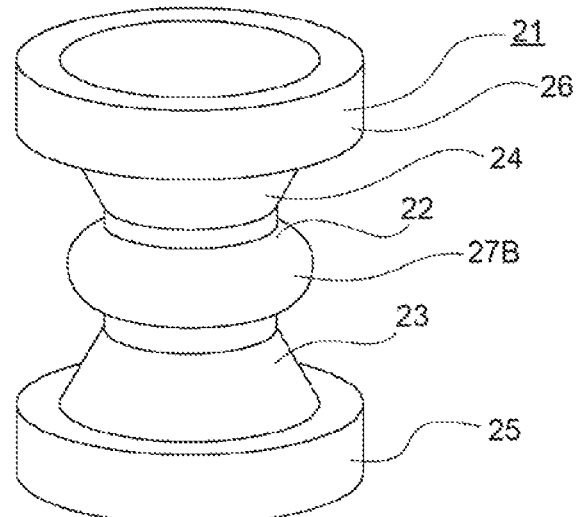
FIG. 11 is a perspective view showing yet another example of the urging spring.

Instead of the urging spring 27, an urging spring 27B that is integrally formed in the pressing tube part 22 may be used (see FIG. 11). The urging spring 27B is made of the same material as the pressing tube part 22 and integrally formed on the outer peripheral side of the pressing tube part 22. For example, the urging spring 27B is formed in an annular shape that is convex outward, and has a cross-sectional shape that is substantially semicircular and convex outward. Thus integrally forming the urging spring 27B in the pressing tube part 22 can reduce the number of parts as well as eliminate the need for the work of installing an urging spring onto the valve 21, so that the work efficiency of the work of assembling the vehicular washing device 1 can be increased.

Figure 12:
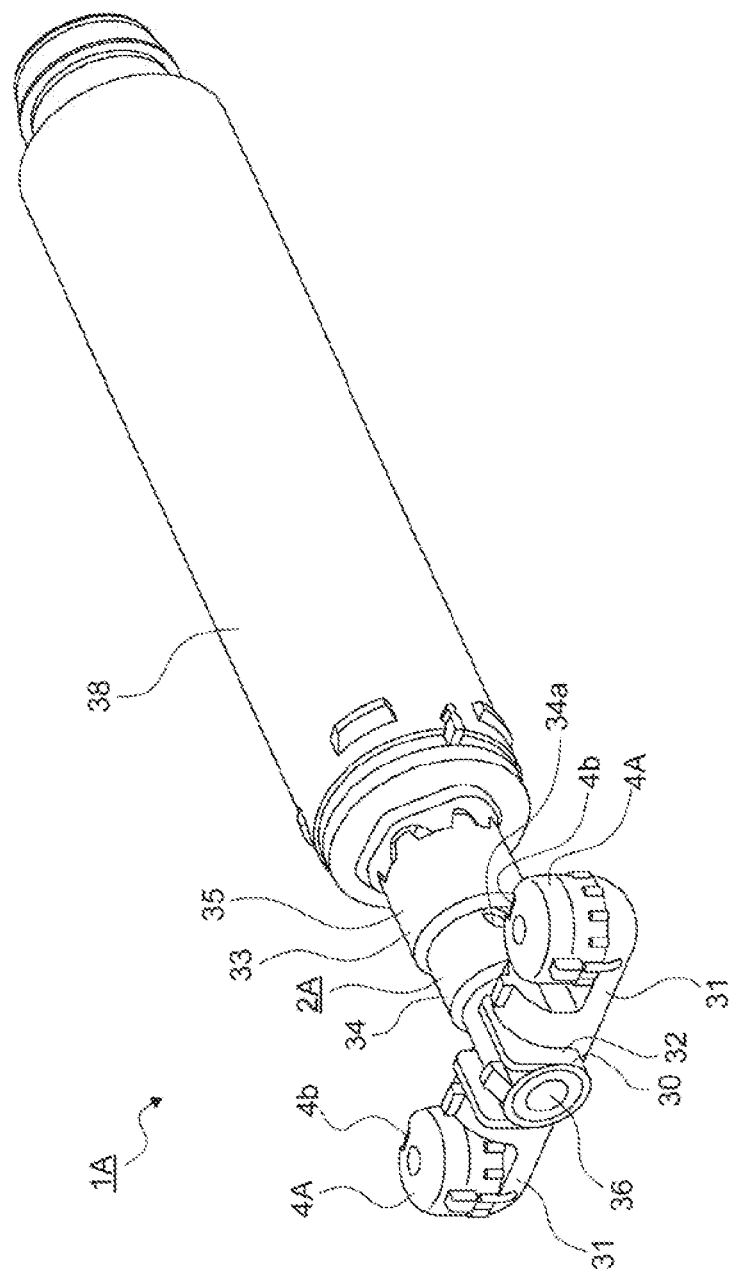
FIG. 12 Showing a second embodiment of the vehicular washing device of the present invention along with FIG. 13 and FIG. 14.
Figure 13:
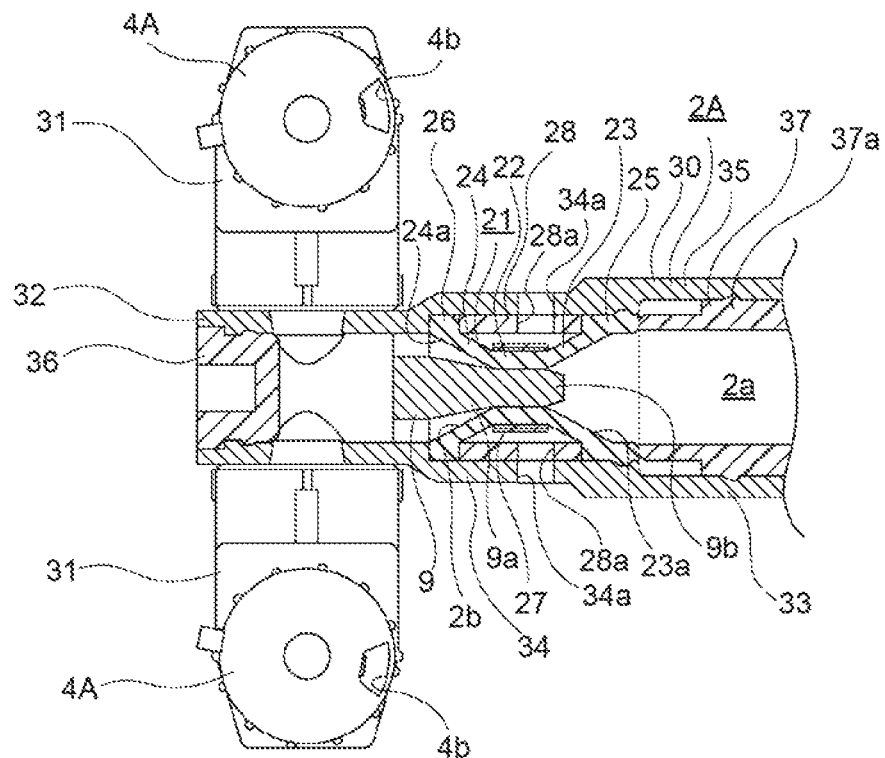
FIG. 13 is a sectional view of the vehicular washing device.
Figure 14:
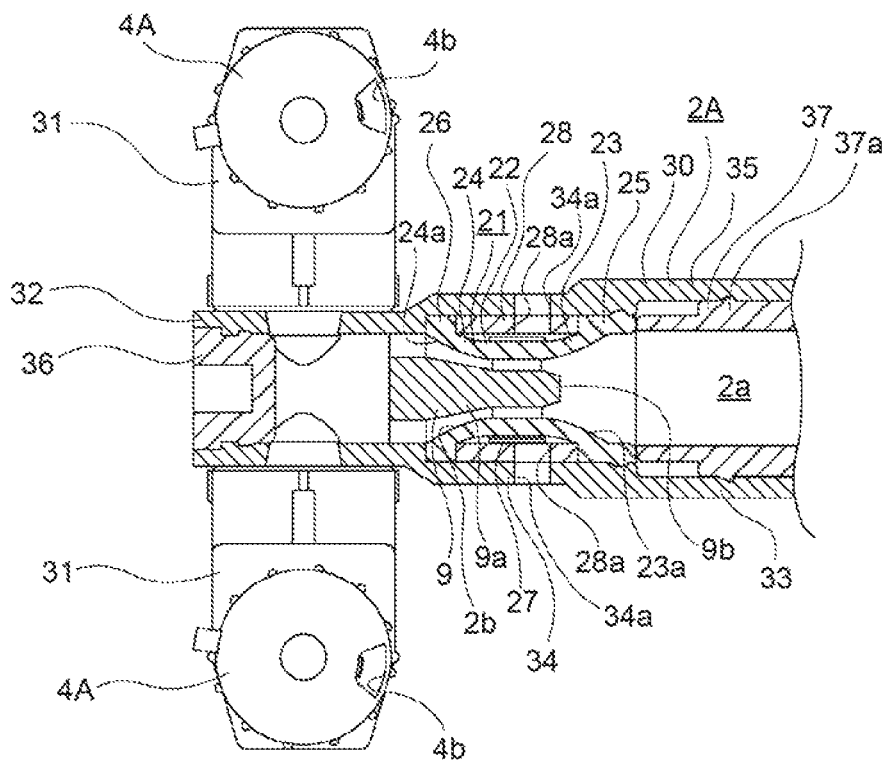
FIG. 14 is a sectional view showing a state where the valve is activated.

Next, a vehicular washing device 1A according to a second embodiment will be descried (see FIG. 12 through FIG. 14).

Compared with the vehicular washing device 1 described above, the vehicular washing device 1A shown below is different in that it has a piston and a cylinder and that a fluid is discharged from a nozzle in a state where the piston has been moved to an end of movement in a protruding direction relatively to the cylinder, but the basic internal structure is the same as that of the vehicular washing device 1. Therefore, for the vehicular washing device 1A, only those parts that are different from the vehicular washing device 1 will be described in detail, while the other parts will be denoted by the same reference signs as the same parts of the vehicular washing device 1 and the description thereof will be omitted.

In the description of the vehicular washing device according to the second embodiment shown below, frontward, rearward, upward, downward, leftward, and rightward directions will be indicated by setting an axial direction of a valve to a front-rear direction. However, the frontward, rearward, upward, downward, leftward, and rightward directions indicated below are for the convenience of description, and implementation of the present invention is not limited to these directions.

The vehicular washing device 1A has a flow passage forming body 2A and nozzles 4A, 4A (see FIG. 12 and FIG. 13). The vehicular washing device 1A is not provided with the joint 3.

The flow passage forming body 2A has a coupling part 30 having a substantially cylindrical shape and nozzle holding parts 31, 31 protruding toward opposite sides from the coupling part 30.

In the coupling part 30, a small-diameter portion 32 and a large-diameter portion 33 are continuously formed in this order from a front side, and the diameter of the small-diameter portion 32 is smaller than the diameter of the large-diameter portion 33. Of the large-diameter portion 33, a substantially front half is provided as an installation section 34 while a substantially rear half is provided as a piston coupling section 35. Air circulation holes 34a, 34a are formed on opposite sides of the installation section 34 in a circumferential direction. The shaft 9 is provided inside the coupling part 30.

A cap 36 that closes a front-side opening of the coupling part 30 is attached to the small-diameter portion 32 of the coupling part 30.

The nozzle holding parts 31, 31 protrude respectively leftward and rightward from the small-diameter portion 32, and protrusion directions are oriented so as to be orthogonal to an axial direction of the coupling part 30. The nozzles 4A, 4A are held respectively at leading end portions of the nozzle holding parts 31, 31.

The valve 21, the urging spring 27, and the spacer 28 are disposed inside the flow passage forming body 2A. The valve 21, the urging spring 27, and the spacer 28 are disposed in the installation section 34 of the large-diameter portion 33. The circulation holes 28a, 28a of the spacer 28 coincide respectively with the air circulation holes 34a, 34a of the installation section 34.

The piston coupling section 35 of the large-diameter portion 33 of the flow passage forming body 2A is coupled to a piston 37. A front end portion of the piston 37 is provided as a coupling tube portion 37a. The piston coupling section 35 of the flow passage forming body 2A is coupled to the coupling tube portion 37a.

The piston 37 is supported by a cylinder 38 so as to be movable in the front-rear direction. A spring member, for example, an extension coil spring (not shown) is disposed inside the piston 37, and the spring member is supported at one end portion by the piston 37 and at the other end portion by the cylinder 38. Thus, an urging force in a direction in which the piston 37 is drawn into the cylinder 38 is applied to the piston 37 by the spring member, and when no fluid is supplied inside the piston 37, the piston 37 is located at a rear end of a movable range.

A rear end portion of the cylinder 38 is provided as a supply pipe coupling portion 38a. The supply pipe 50 is coupled to the supply pipe coupling portion 38a. The fluid flows from the supply tank to the supply pipe 50, and the fluid having flowed flows from an internal space of the piston 37 toward the nozzles 4A, 4A through the first flow passage 2a and the second flow passage 2b of the flow passage forming body 2A.

In the vehicular washing device 1A thus configured, when the fluid is supplied from the supply tank into the piston 37 through the supply pipe 50, the piston 37 moves under the pressure of the fluid in the protruding direction (a frontward direction) relatively to the cylinder 38 against the urging force of the spring member. When the piston 37 has been moved to a front end of the movable range, the pressure (internal pressure) of the first flow passage 2a has become higher than the atmospheric pressure, so that the valve 21 is elastically deformed in a diameter increasing direction of the pressing tube part 22 against the urging force of the urging spring 27 (see FIG. 14), creating a gap between the inner peripheral surface of the pressing tube part 22 and the outer peripheral surface of the pressed part 9b of the shaft 9, through which the fluid flows from the first flow passage 2a toward the second flow passage 2b.

The fluid having flowed toward the second flow passage 2b flows into the discharge space 4a of the nozzle 4A and is sprayed through the discharge opening 4b toward an object to be washed, such as a vehicular lamp, and the object to be washed is washed with the sprayed fluid.

When supply of the fluid from the supply tank stops, the pressure inside the flow passage forming body 2A decreases and the valve 21 and the urging spring 27 are elastically restored, so that the pressing tube part 22 is brought into close contact with the pressed part 9b of the shaft 9 (see FIG. 13) and spraying of the fluid from the nozzle 4A stops. Then, as the pressure of the fluid decreases, the spring member is compressed and the piston 37 is moved to the rear end of the movable range in the direction in which the piston 37 is drawn into the cylinder 38.

On the other hand, the fluid may remain in a space from the nozzles 4A, 4A to the valve 21 in the vehicular washing device 1A, and the remaining fluid may expand due to freezing etc. in a cold region or the like. If the fluid thus expands, the pressure (internal pressure) of the second flow passage 2b becomes higher than the atmospheric pressure, so that the valve 21 is elastically deformed in the diameter increasing direction of the pressing tube part 22 against the urging force of the urging spring 27 (see FIG. 14), creating a gap between the inner peripheral surface of the pressing tube part 22 and the outer peripheral surface of the pressed part 9b of the shaft 9, through which the fluid can flow from the second flow passage 2b toward the first flow passage 2a.

As a result, the pressure on the parts of the valve 21 and the flow passage forming body 2A decreases, so that damage or breakage of the valve 21 and the flow passage forming body 2A does not occur.

When freezing etc. of the fluid disappears and the pressure of the second flow passage 2b decreases, the valve 21 is elastically restored and the pressing tube part 22 returns to its original state of being in close contact with the pressed part 9b of the shaft 9 (see FIG. 13).

Also in the vehicular washing device 1A according to the second embodiment, the valve 21A or the valve 21B can be used instead of the valve 21, and the urging spring 27A or the urging spring 27B can be used instead of the urging spring 27.

As has been described above, the vehicular washing devices 1, 1A are provided with the valve 21 that is elastically deformable in the direction in which the diameter of the pressing tube part 22 changes. The shaft 9 with which the pressing tube part 22 can come into close contact is located inside the valve 21. The valve 21 deforms elastically according to the magnitude of the pressure of the first flow passage 2a or the pressure of the second flow passage 2b relative to the atmospheric pressure.

Thus, since the diameter of the pressing tube part 22 changes to open the flow passage when the pressure of the first flow passage 2a or the pressure of the second flow passage 2b becomes high relative to the atmospheric pressure, no excessive pressure is applied to the valve 21 and the flow passage forming bodies 2, 2A. Therefore, malfunction due to expansion of the fluid can be eliminated to ensure a normal operating state of the vehicular washing devices 1, 1A.

Since the shaft 9 is integrally formed in the flow passage forming bodies 2, 2A, there is no need to provide a dedicated shaft with which the valve 21 comes into close contact, and the number of parts can be reduced.

Next, a vehicular washing device 101 according to a third embodiment will be described (see FIG. 15 through FIG. 18).

In the vehicular washing device according to the third embodiment shown below, a flow passage is opened as a valve is moved, and a fluid flows inside a nozzle holder toward a nozzle. In the following description, frontward, rearward, upward, downward, leftward, and rightward directions will be indicated by setting an axial direction of the nozzle holder to an up-down direction. However, the frontward, rearward, upward, downward, leftward, and rightward directions indicated below are for the convenience of description, and implementation of the present invention is not limited to these directions.

Figure 15:
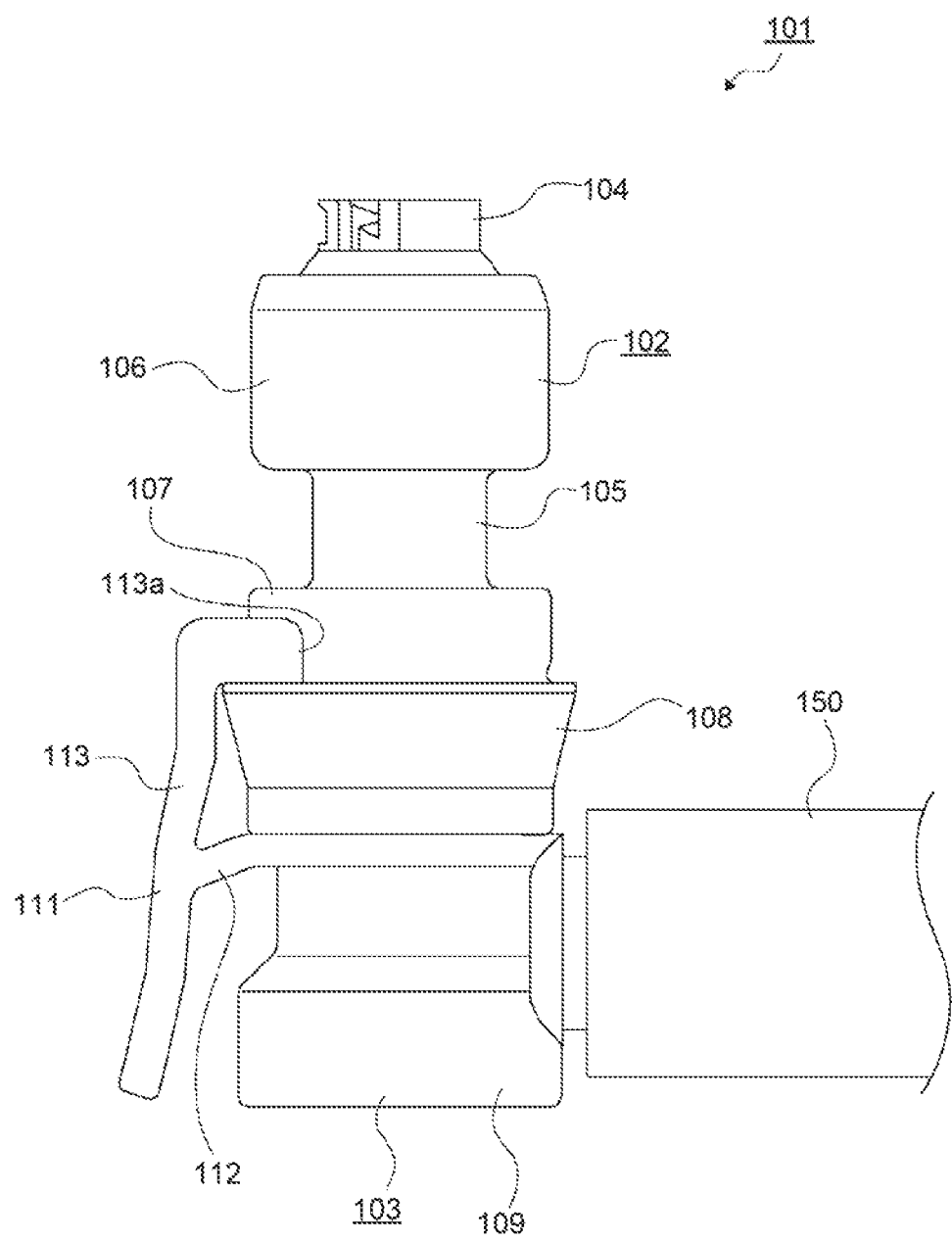
FIG. 15 Showing a third embodiment of the vehicular washing device of the present invention along with FIG. 16 through FIG. 18.
Figure 16:
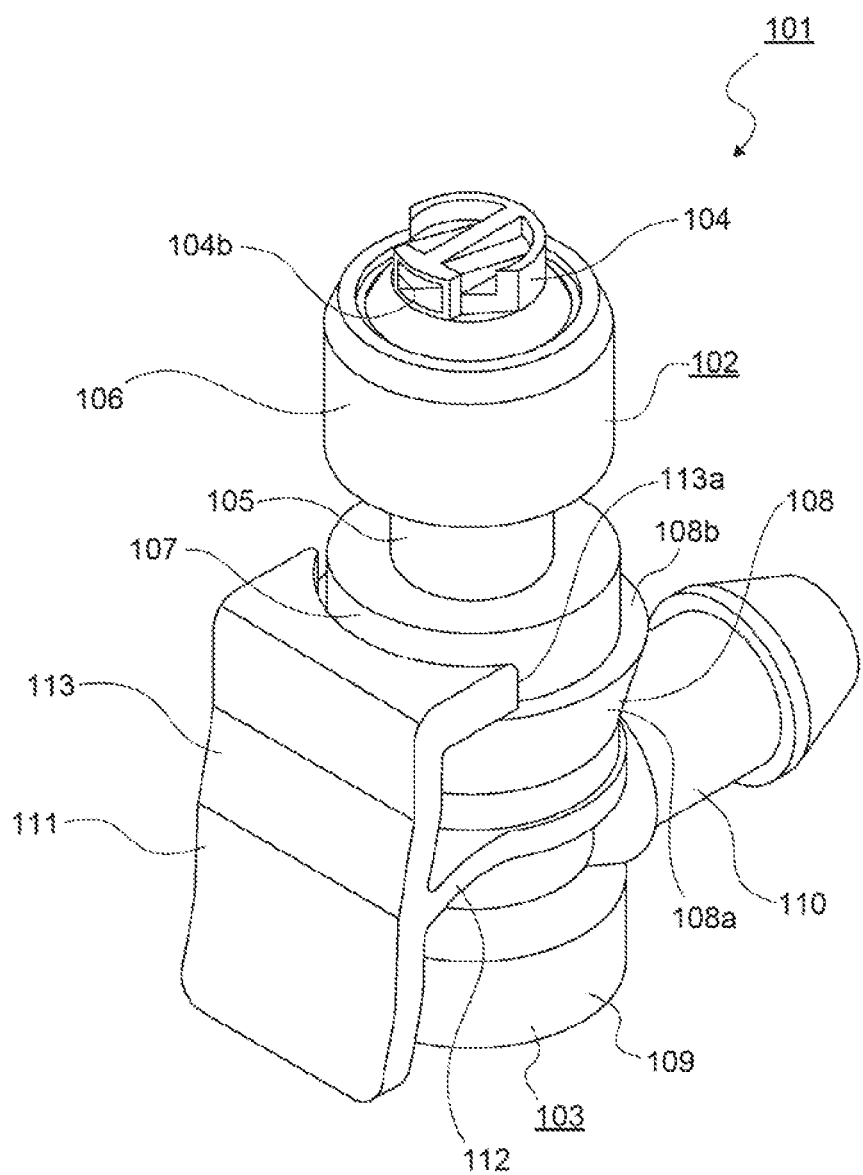
FIG. 16 is a perspective view of the vehicular washing device.
Figure 17:
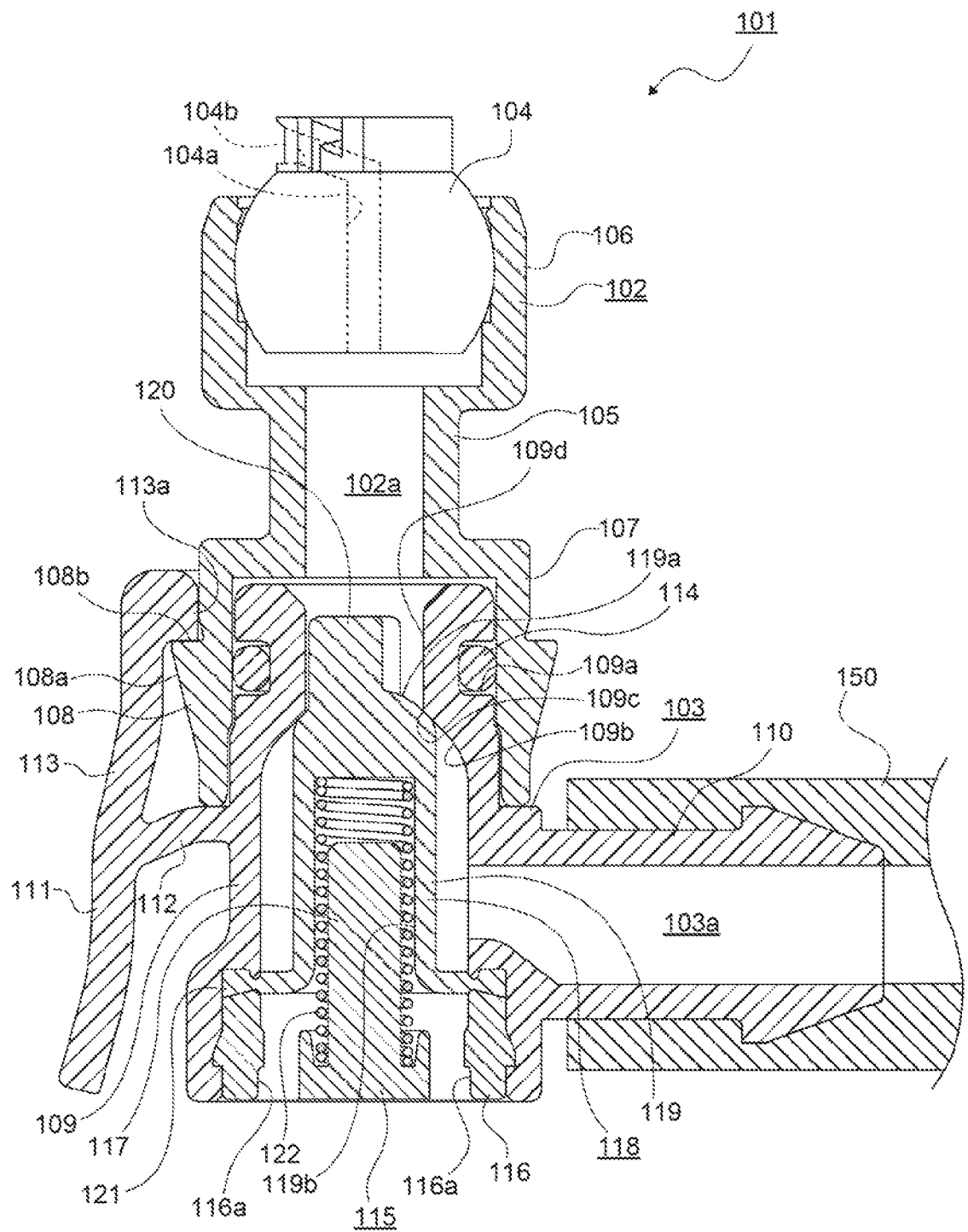
FIG. 17 is a sectional view of the vehicular washing device.
Figure 18:
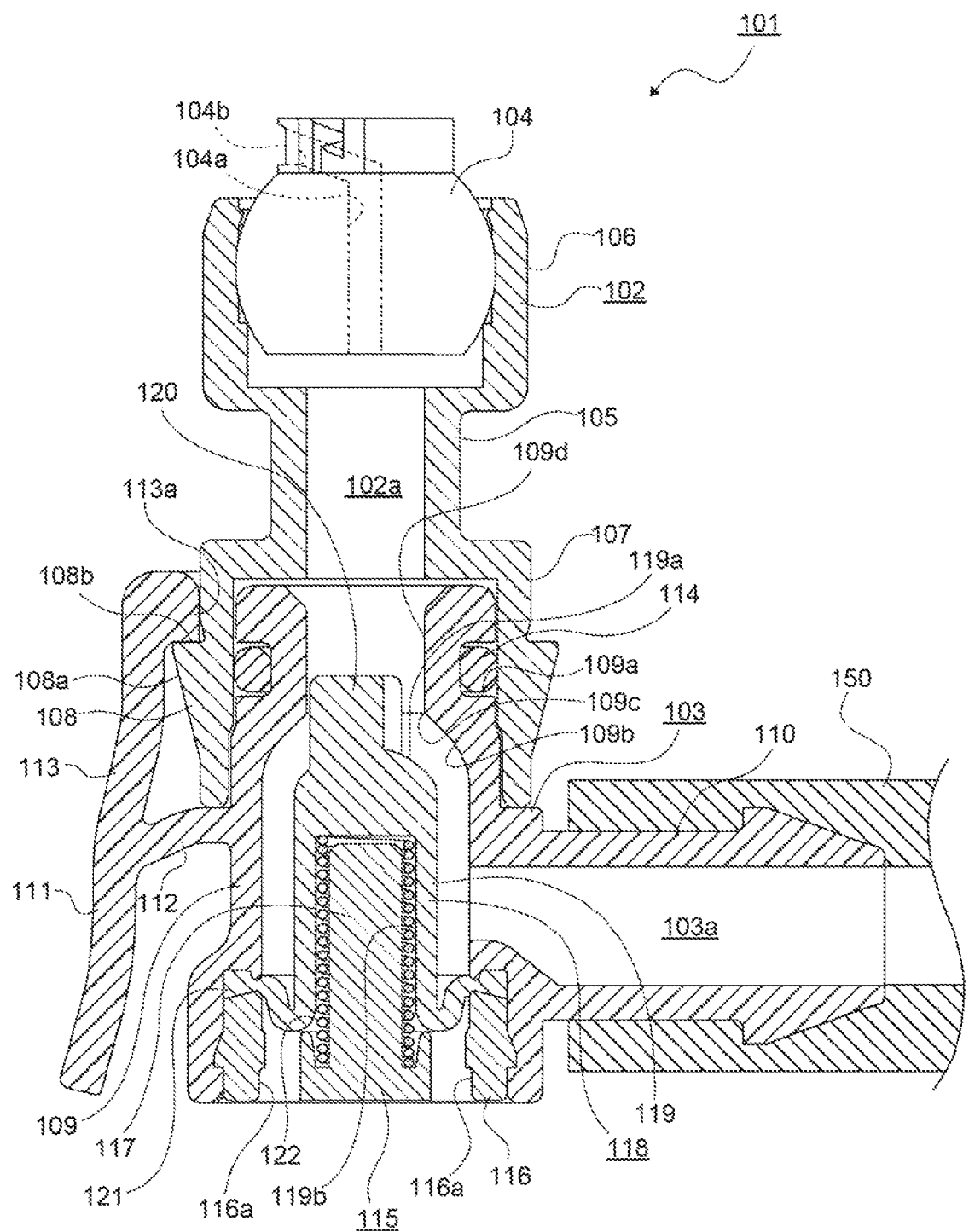
FIG. 18 is a sectional view showing a state where a valve is activated and a flow passage is opened.

The vehicular washing device 101 has a nozzle holder 102, a joint 103, and a nozzle 104 (see FIG. 15 through FIG. 17).

The nozzle holder 102 has an axial direction oriented in the up-down direction, and has a cylindrical tubular part 105, a nozzle holding part 106 continuous with an upper end portion of the tubular part 105, and a joint coupling part 107 continuous with a lower end portion of the tubular part 105. An internal space of the nozzle holder 102 is formed as a flow passage 102a.

The tubular part 105 has a diameter smaller than the diameters of the nozzle holding part 106 and the joint coupling part 107, and is mounted, for example, to a vehicle body or a bumper. The nozzle holding part 106 opens upward and the joint coupling part 107 opens downward.

The nozzle holder 102 is provided with an annular coupling engaging portion 108 that protrudes outward from the joint coupling part 107. The coupling engaging portion 108 has an inclined surface 108a that is an outer surface shifting outward while extending upward and a ring-shaped engaging surface 108b that is continuous with an upper end of the inclined surface 108a and faces upward.

The nozzle 104 has a spherical outer peripheral surface except for an upper end portion, and has a discharge space 104a formed inside. A discharge opening 104b communicating with the discharge space 104a is formed in the upper end portion of the nozzle 104.

The nozzle 104 is press-fitted in the nozzle holding part 106 of the nozzle holder 102 in a nested state. The nozzle 104 may be rotatable in an arbitrary direction relatively to the nozzle holding part 106. In a state where the nozzle 104 is held by the nozzle holding part 106, the discharge space 104a communicates with an internal space of the nozzle holding part 106.

The joint 103 is coupled to the joint coupling part 107 of the nozzle holder 102. The joint 103 is attachable to and detachable from the nozzle holder 102. An internal space of the joint 103 is formed as a flow passage 103a. The joint 103 has a coupling tube part 109 extending in the up-down direction, a pipe coupling part 110 protruding rearward from a lower end portion of the coupling tube part 109, and a coupling protrusion 111 continuous with the coupling tube part 109.

The coupling tube part 109 has a substantially cylindrical shape with an axial direction oriented in the up-down direction. A ring insertion groove 109a extending in a circumferential direction is formed in the coupling tube part 109, at a position near an upper end. A curved surface 109b shifting inward while extending upward is formed inside the coupling tube part 109, at a position near the upper end. An upper edge of the curved surface 109b of the coupling tube part 109 is formed as an opening 109c, and a part of an internal space of the coupling tube part 109 on an upper side of the opening 109c is formed as an insertion space 109d with a constant diameter.

An internal space of the pipe coupling part 110 communicates with the internal space of the coupling tube part 109.

The coupling protrusion 111 has an arm 112 protruding frontward from the coupling tube part 109 and an acting part 113 continuous with a leading end portion of the arm 112, and a central portion of the acting part 113 in the up-down direction is continuous with the arm 112. An engaging portion 113a protruding toward the coupling tube part 109 is provided at an upper end portion of the acting part 113. The coupling protrusion 111 is elastically deformable in directions in which upper and lower end portions of the acting part 113 are moved closer to and away from the coupling tube part 109.

A sealing ring 114 made of rubber etc. is inserted in the ring insertion groove 109a of the coupling tube part 109.

The joint 103 is coupled to the nozzle holder 102 from below, and coupling of the joint 103 to the nozzle holder 102 is done by inserting the coupling tube part 109 into the joint coupling part 107 of the nozzle holder 102. To insert the coupling tube part 109 into the joint coupling part 107, a portion of the joint coupling part 107 is inserted between the coupling tube part 109 and the acting part 113, and the engaging portion 113a is slid over the inclined surface 108a of the coupling engaging portion 108. When the engaging portion 113a is slid over the inclined surface 108a, the coupling protrusion 111 is elastically deformed in a direction in which the engaging portion 113a is moved away from the coupling tube part 109. When a lower edge of the engaging portion 113a reaches an upper edge of the inclined surface 108a, the coupling protrusion 111 is elastically restored and the engaging portion 113a is engaged with the engaging surface 108b.

The joint 103 is coupled to the nozzle holder 102 as the coupling tube part 109 is inserted into the joint coupling part 107 and the engaging portion 113a is engaged with the engaging surface 108b. In a state where the joint 103 is coupled to the nozzle holder 102, sealing between the coupling tube part 109 and the joint coupling part 107 is provided by the sealing ring 114.

Thus, since coupling of the joint 103 to the nozzle holder 102 can be done in one step of inserting the coupling tube part 109 into the joint coupling part 107 from below, the work efficiency of the work of coupling the joint 103 to the nozzle holder 102 can be increased.

On the other hand, the joint 103 is removed from the nozzle holder 102 by elastically deforming the coupling protrusion 111 so as to disengage the engaging portion 113a from the engaging surface 108b and pulling the coupling tube part 109 downward out of the joint coupling part 107. Here, the coupling protrusion 111 can be elastically deformed by pressing the lower end portion of the acting part 113 toward the coupling tube part 109, which makes it easy to remove the joint 103 from the nozzle holder 102.

Since the vehicular washing device 101 is provided with the nozzle holder 102 that holds the nozzle 104, and the joint 103 is attachable to and detachable from the nozzle holder 102, there is no other member between the nozzle holder 102 and the joint 103 and the number of parts can be reduced.

Further, the joint 103 is provided with the coupling tube part 109 that is coupled to the nozzle holder 102 and the pipe coupling part 110 to which the supply pipe 150 is coupled, and an axial direction of the coupling tube part 109 and an axial direction of the pipe coupling part 110 are different directions.

Thus, a flow path of the fluid flowing from the supply pipe 150 toward the nozzle 104 through the pipe coupling part 110 and the coupling tube part 109 is a bent flow path. Thus, it is possible to increase flexibility in designing in which an installation space in the vehicle and so on are taken into account.

Moreover, the joint 103 is provided with the elastically deformable coupling protrusion 111, and the joint 103 is attached to the nozzle holder 102 as the engaging portion 113a of the coupling protrusion 111 is engaged with the coupling engaging portion 108 of the nozzle holder 102.

Thus, the joint 103 is attached to or detached from the nozzle holder 102 as the coupling protrusion 111 is elastically deformed or elastically restored, which makes it easy to perform the work of attaching or detaching the joint 103 to or from the nozzle holder 102.

The supply pipe 150, such as a hose, is coupled to the pipe coupling part 110 of the joint 103. A fluid, such as washing water or a washing liquid, is supplied from a supply tank (not shown) to the supply pipe 150, and the fluid supplied flows from the flow passage 103a of the joint 103 toward the nozzle 104 through the flow passage 102a of the nozzle holder 102.

A cap 115 that closes a lower-side opening of the coupling tube part 109 is attached to the joint 103. The cap 115 is provided with a substantially disc-shaped closing part 116 and a spring supporting part 117 protruding upward from a central portion of the closing part 116. Air circulation holes 116a, 116a are formed so as to extend through the closing part 116 in the up-down direction.

The cap 115 is attached to the joint 103 with the closing part 116 closing the lower-side opening of the coupling tube part 109.

A valve 118 is disposed inside the coupling tube part 109 of the joint 103. The valve 118 is made of an elastically deformable rubber material etc.

The valve 118 has an opening-closing part 119 extending in the up-down direction, a protruding part 120 protruding upward from the opening-closing part 119, and a flange-shaped mounted part 121 projecting outward from a lower end portion of the opening-closing part 119. An outer peripheral surface of an upper end portion of the opening-closing part 119 is formed as a curved pressing surface 119a that is convex upward, and the pressing surface 119a has substantially the same curvature as the curved surface 109b of the coupling tube part 109. The opening-closing part 119 has an installation space 119b opening downward. The protruding part 120 has a lower edge coinciding with an upper edge of the pressing surface 119a, and has a diameter smaller than a maximum diameter of the opening-closing part 119.

The valve 118 is disposed inside the coupling tube part 109, with an outer peripheral portion of the mounted part 121 held from above and below between a portion of the coupling tube part 109 and the closing part 116 of the cap 115. The mounted part 121 of the valve 118 is elastically deformable in directions in which the opening-closing part 119 and the protruding part 120 are moved upward and downward.

The valve 118 is urged by an urging spring 122 in a direction in which the pressing surface 119a is pressed against the curved surface 109b of the coupling tube part 109. The urging spring 122 is a helical compression spring, for example. The urging spring 122 is inserted in the installation space 119b of the valve 118 except for a lower end portion, has the spring supporting part 117 of the cap 115 inserted inside, and is pressed at upper and lower end portions against the valve 118 and the closing part 116 of the cap 115, respectively.

When a downward moving force is not applied to the valve 118, the pressing surface 119a is pressed against the curved surface 109b and the opening 109c is closed with the opening-closing part 119, and the entire protruding part 120 is inserted in the insertion space 109d.

In the vehicular washing device 101 thus configured, the fluid is supplied from the supply tank to the flow passage 103a of the joint 103 through the supply pipe 150 and heads for the valve 118.

Here, outside air is taken into a lower side of the valve 118 inside the nozzle holder 102 through the air circulation holes 116a, 116a of the cap 115, and as the fluid heads for the valve 118, the pressure (internal pressure) of the flow passage 103a becomes higher than the atmospheric pressure. Therefore, the mounted part 121 of the valve 118 is elastically deformed and moved downward against the urging force of the urging spring 122 (see FIG. 18), and the pressing surface 119a of the opening-closing part 119 is moved away from the curved surface 109b of the joint 103, so that the opening 109c opens and the fluid flows through the opening 109c from the flow passage 102a toward the nozzle 104. Here, the fluid flows toward the nozzle 104 through a part of the flow passage 103a on an outer peripheral side of the valve 118.

Thus, since the vehicular washing device 101 is provided with the urging spring 122 located inside the valve 118 and the fluid flows outside the valve 118, the flow of the fluid is not hindered by the urging spring 122 and a smoothly flowing state of the fluid can be ensured.

The fluid having flowed toward the nozzle 104 flows into the discharge space 104a and is sprayed through the discharge opening 104b toward an object to be washed, such as a vehicular lamp, and the object to be washed is washed with the sprayed fluid.

When supply of the fluid from the supply tank stops, the pressure inside the joint 103 decreases and the mounted part 121 and the urging spring 122 are elastically restored. As a result, the valve 118 is moved upward, so that the pressing surface 119a of the opening-closing part 119 is pressed against the curved surface 109b of the joint 103 to close the opening 109c (see FIG. 17), and spraying of the fluid from the nozzle 104 stops.

On the other hand, the fluid may remain in a space from the nozzle 104 to the valve 118 in the vehicular washing device 101, and the remaining fluid may expand due to freezing etc. in a cold region or the like. If the fluid thus expands, the pressure (internal pressure) of the space from the nozzle 104 to the valve 118 becomes higher than the atmospheric pressure, so that the valve 118 is moved downward against the urging force of the urging spring 122 (see FIG. 18) to open the opening 109c and the fluid can flow toward a lower end side of the valve 118.

Thus, when the fluid expands, the opening 109c is opened and the fluid can flow toward the lower end side of the valve 118. As a result, the pressure on the parts of the valve 118 and the nozzle holder 102 decreases, so that damage or breakage of the valve 118 and the nozzle holder 102 does not occur.

When freezing etc. of the fluid disappears and the pressure of the space from the nozzle 104 to the valve 118 decreases, the mounted part 121 and the urging spring 122 are elastically restored and the pressing surface 119a of the opening-closing part 119 returns to its original state of being pressed against the curved surface 109b of the joint 103 (see FIG. 17).

Figure 19:
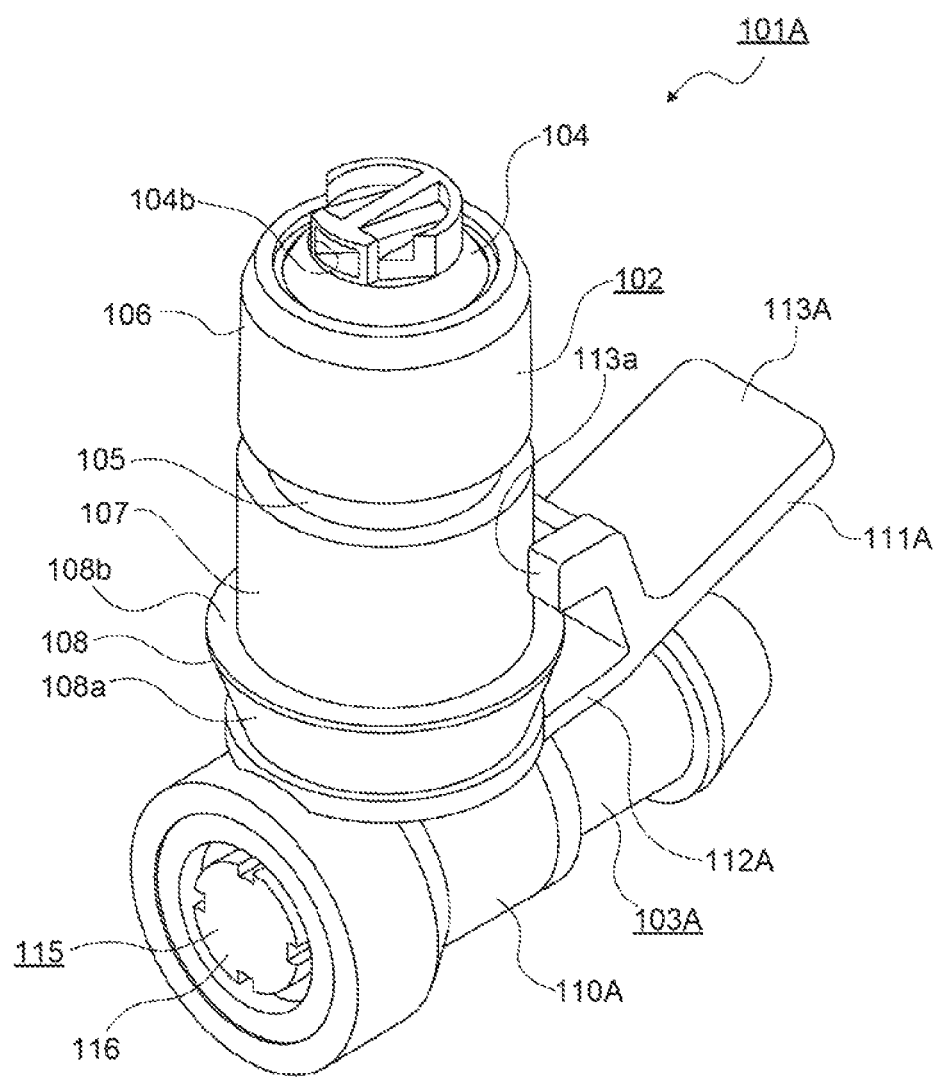
FIG. 19 Showing a fourth embodiment of the vehicular washing device of the present invention along with FIG. 20.
Figure 20:
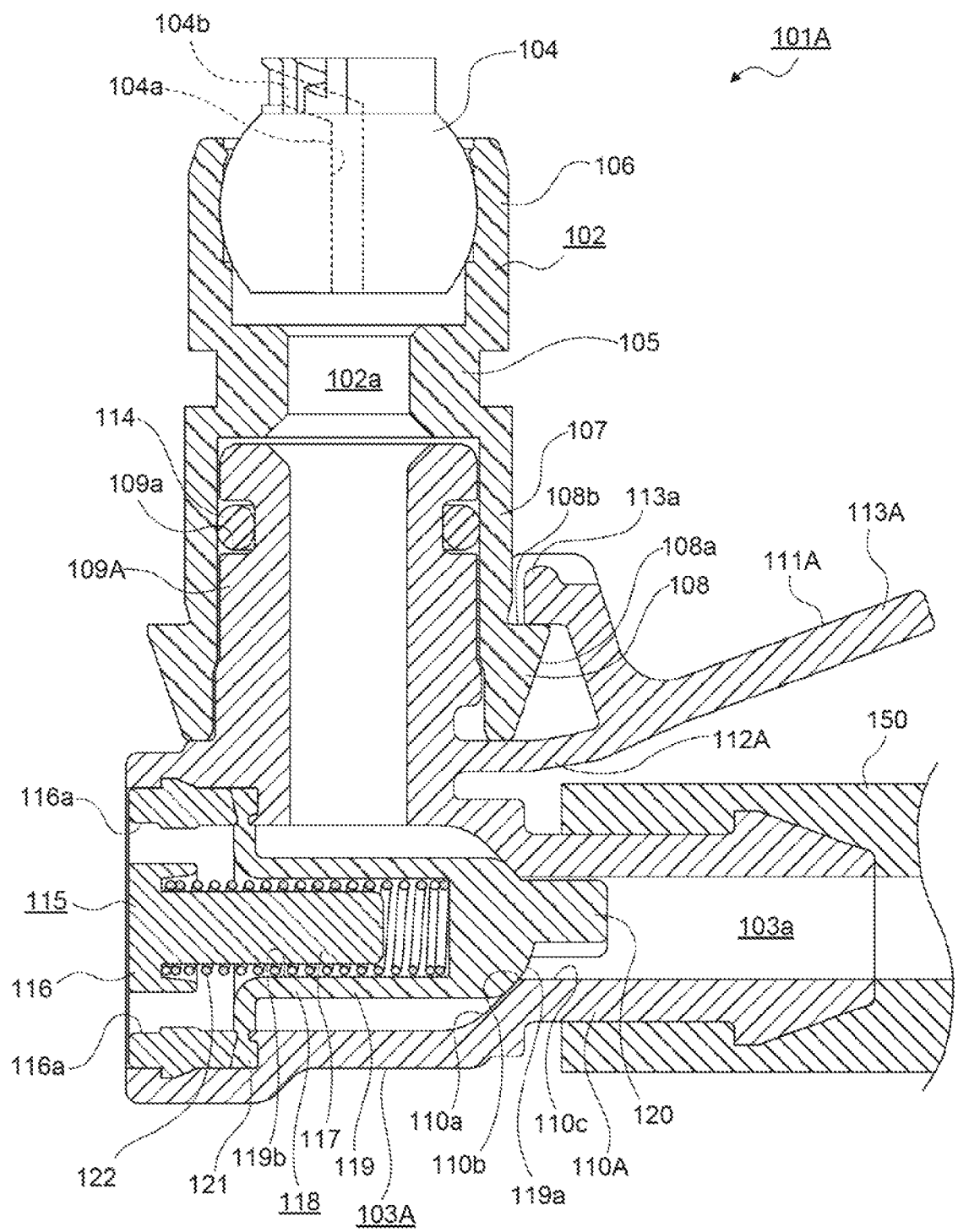
FIG. 20 is a sectional view of the vehicular washing device.
Figure 21:
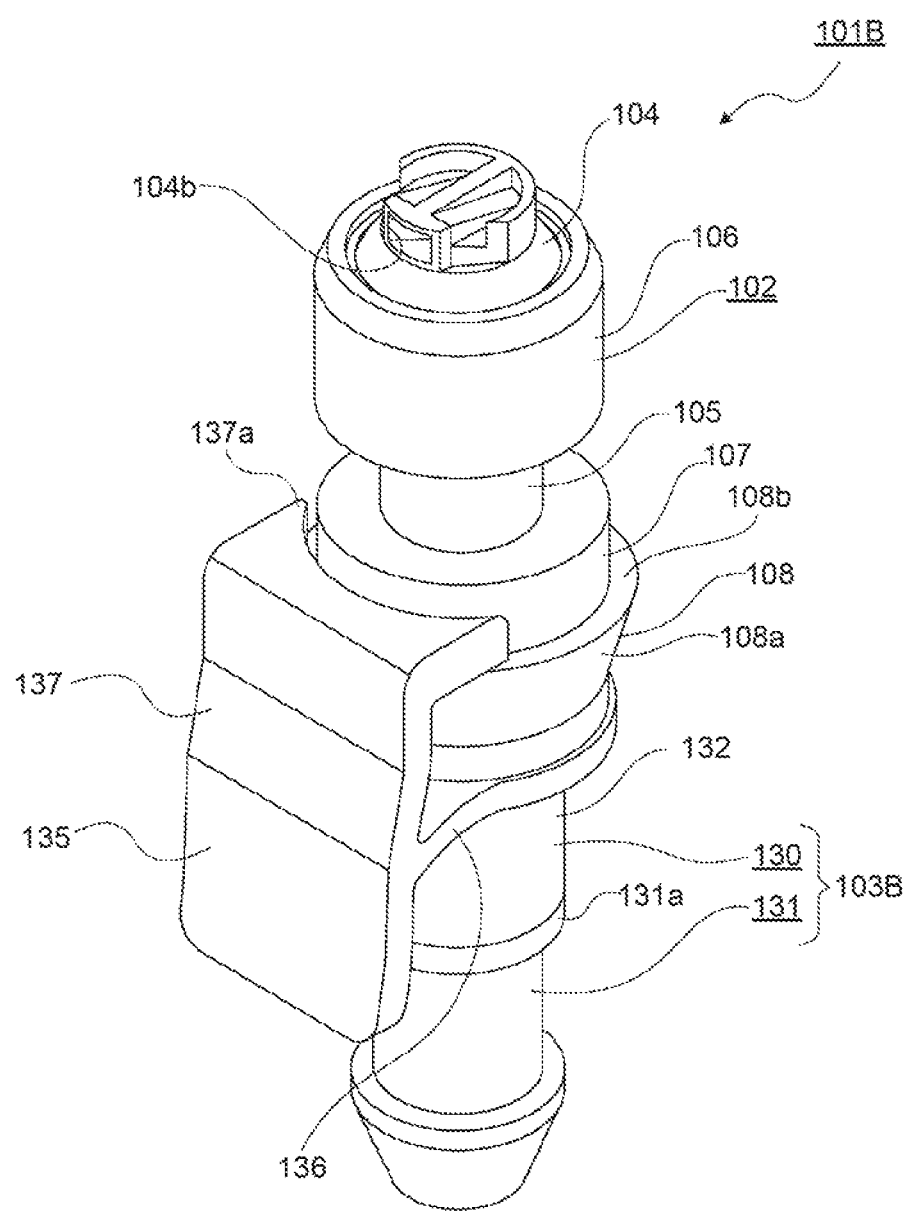
FIG. 21 Showing a fifth embodiment of the vehicular washing device of the present invention along with FIG. 22 through FIG. 25.

Next, a vehicular washing device 101A according to a fourth embodiment will be described (see FIG. 19 and FIG. 20).

Compared with the vehicular washing device 101 described above, the vehicular washing device 101A shown below is different in the direction of installation of the valve relative to the joint and in the position of the coupling protrusion, but the basic structure is the same as that of the vehicular washing device 101. Therefore, for the vehicular washing device 101A, only those parts that are different from the vehicular washing device 101 will be described in detail, while the other parts will be denoted by the same reference signs as the same parts of the vehicular washing device 101 and the description thereof will be omitted.

In the description of the vehicular washing device according to the fourth embodiment shown below, frontward, rearward, upward, downward, leftward, and rightward directions will be indicated by setting an axial direction of a nozzle holder to an up-down direction. However, the frontward, rearward, upward, downward, leftward, and rightward directions indicated below are for the convenience of description, and implementation of the present invention is not limited to these directions.

The vehicular washing device 101A has the nozzle holder 102, a joint 103A, and the nozzle 104.

The joint 103A is coupled to the joint coupling part 107 of the nozzle holder 102. The joint 103A is attachable to and detachable from the nozzle holder 102. The joint 103A has a coupling tube part 109A extending in the up-down direction, a pipe coupling part 110A continuous with the coupling tube part 109A, and a coupling protrusion 111A protruding from the coupling tube part 109A.

The coupling tube part 109A has a substantially cylindrical shape with an axial direction oriented in the up-down direction.

The pipe coupling part 110A has a substantially cylindrical shape with an axial direction oriented in a front-rear direction, and a portion near a front end is continuous with a lower end portion of the coupling tube part 109A. A curved surface 110a shifting inward while extending rearward is formed inside the pipe coupling part 110A, at a central portion in the front-rear direction. A rear edge of the curved surface 110a of the pipe coupling part 110A is formed as an opening 110b, and a part of an internal space of the pipe coupling part 110A on a rear side of the opening 110b is formed as an insertion space 110c with a constant diameter.

The coupling protrusion 111A has an arm 112A protruding rearward from the coupling tube part 109A and an acting part 113A continuous with a leading end portion of the arm 112A, and an intermediate portion of the acting part 113A in a longitudinal direction is continuous with the arm 112A. The acting part 113A has a shape bent substantially at a right angle, and a bent portion is continuous with the arm 112A. At an end portion on the side of the coupling tube part 109A, the acting part 113A has an engaging portion 113a protruding toward the coupling tube part 109A. The coupling protrusion 111A is elastically deformable in directions in which the engaging portion 113a is moved closer to and away from the coupling tube part 109A.

The joint 103A is coupled to the nozzle holder 102 from below, and coupling of the joint 103A to the nozzle holder 102 is done by inserting the coupling tube part 109A into the joint coupling part 107 of the nozzle holder 102. To insert the coupling tube part 109A into the joint coupling part 107, a portion of the joint coupling part 107 is inserted between the coupling tube part 109A and the acting part 113A, and the engaging portion 113a is slid over the inclined surface 108a of the coupling engaging portion 108. When the engaging portion 113a is slid over the inclined surface 108a, the coupling protrusion 111A is elastically deformed in the direction in which the engaging portion 113a is moved away from the coupling tube part 109A. When a lower edge of the engaging portion 113a reaches an upper edge of the inclined surface 108a, the coupling protrusion 111A is elastically restored and the engaging portion 113a is engaged with the engaging surface 108b.

Thus, since coupling of the joint 103A to the nozzle holder 102 can be done in one step of inserting the coupling tube part 109A into the joint coupling part 107 from below, the work efficiency of the work of coupling the joint 103A to the nozzle holder 102 can be increased.

On the other hand, the joint 103A can be removed from the nozzle holder 102 by elastically deforming the coupling protrusion 111A so as to disengage the engaging portion 113a from the engaging surface 108b and pulling the coupling tube part 109A downward out of the joint coupling part 107. Here, the coupling protrusion 111A can be elastically deformed by pressing an end portion of the acting part 113A on the opposite side from the engaging portion 137a, which makes it easy to remove the joint 103A from the nozzle holder 102.

Since the vehicular washing device 101A is provided with the nozzle holder 102 that holds the nozzle 104, and the joint 103A is attachable to and detachable from the nozzle holder 102, there is no other member between the nozzle holder 102 and the joint 103A and the number of parts can be reduced.

Further, the joint 103A is provided with the coupling tube part 109A that is coupled to the nozzle holder 102 and the pipe coupling part 110A to which the supply pipe 150 is coupled, and an axial direction of the coupling tube part 109A and an axial direction of the pipe coupling part 110A are different directions.

Thus, a flow path of the fluid flowing from the supply pipe 150 toward the nozzle 104 through the pipe coupling part 110A and the coupling tube part 109A is a bent flow path.

Thus, it is possible to increase flexibility in designing in which an installation space in the vehicle and so on are taken into account.

Moreover, the joint 103A is provided with the elastically deformable coupling protrusion 111A, and the joint 103A is attached to the nozzle holder 102 as the engaging portion 113a of the coupling protrusion 111A is engaged with the coupling engaging portion 108 of the nozzle holder 102.

Thus, the joint 103A is attached to or detached from the nozzle holder 102 as the coupling protrusion 111A is elastically deformed or elastically restored, which makes it easy to perform the work of attaching or detaching the joint 103A to or from the nozzle holder 102.

The joint 103A is provided with the cap 115 that closes a front-side opening of the pipe coupling part 110A.

The valve 118 is disposed inside the pipe coupling part 110A of the joint 103A. The valve 118 has the opening-closing part 119 extending in the front-rear direction, the protruding part 120 protruding rearward from the opening-closing part 119, and the flange-shaped mounted part 121 projecting outward from a front end portion of the opening-closing part 119. The valve 118 is disposed inside the pipe coupling part 110A, with an outer peripheral portion of the mounted part 121 held from front and rear sides between the closing part 116 of the cap 115 and a portion of the pipe coupling part 110A. The mounted part 121 of the valve 118 is elastically deformable in directions in which the opening-closing part 119 and the protruding part 120 are moved frontward and rearward.

In the vehicular washing device 101A thus configured, the valve 118 is moved in the front-rear direction to open or close the opening 110b. As a result, the fluid flows to the nozzle 104 or flowing stops, and the pressure exerted by the fluid upon expansion on the parts of the valve 118 and the nozzle holder 102 decreases.

Next, a vehicular washing device 101B according to a fifth embodiment will be described (see FIG. 21 through FIG. 25).

Compared with the vehicular washing device 101 described above, the vehicular washing device 101B shown below is different in the configuration of a valve, an urging spring, and a joint. Therefore, for the vehicular washing device 101B, only those parts that are different from the vehicular washing device 101 will be described in detail, while the other parts will be denoted by the same reference signs as the same parts of the vehicular washing device 101 and the description thereof will be omitted.

In the description of the vehicular washing device according to the fifth embodiment shown below, frontward, rearward, upward, downward, leftward, and rightward directions will be indicated by setting an axial direction of a nozzle holder to a front-rear direction. However, the frontward, rearward, upward, downward, leftward, and rightward directions indicated below are for the convenience of description, and implementation of the present invention is not limited to these directions.

The vehicular washing device 101B has the nozzle holder 102, a joint 103B, and the nozzle 104.

The joint 103B is composed of a holder coupling member 130 and a pipe coupling member 131 that are coupled together in an up-down direction.

The holder coupling member 130 has a substantially cylindrical coupling tube part 132 with an axial direction oriented in the up-down direction, a flat plate-shaped partition plate 133 provided at a position near an upper end of the coupling tube part 132 and facing the up-down direction, a shaft 134 protruding downward from a central portion of the partition plate 133, and a coupling protrusion 135 protruding outward from the coupling tube part 132. Air circulation holes 132a, 132a are formed on opposite sides of the coupling tube part 132 in a circumferential direction. A ring insertion groove 132b extending in the circumferential direction is formed in the coupling tube part 132, at a position near an upper end. Pass-through holes 133a, 133a, . . . are formed in the partition plate 133.

The shaft 134 is composed of a diameter changing part 134a which is continuous with the partition plate 133 and of which the diameter decreases downward, and a pressed part 134b which protrudes downward from the diameter changing part 134a and of which the diameter is substantially constant.

The coupling protrusion 135 has an arm 136 protruding frontward from the coupling tube part 132 and an acting part 137 continuous with a leading end portion of the arm 136, and a central portion of the acting part 137 in the up-down direction is continuous with the arm 136. An engaging portion 137a protruding toward the coupling tube part 132 is provided at an upper end portion of the acting part 137. The coupling protrusion 135 is elastically deformable in directions in which upper and lower end portions of the acting part 137 are moved closer to and away from the coupling tube part 132.

A sealing ring 114 made of rubber etc. is inserted in a ring insertion groove 132b of the coupling tube part 132.

The joint 103B is coupled to the nozzle holder 102 from below, and coupling of the joint 103B to the nozzle holder 102 is done by inserting the coupling tube part 132 into the joint coupling part 107 of the nozzle holder 102. To insert the coupling tube part 132 into the joint coupling part 107, a portion of the joint coupling part 107 is inserted between the coupling tube part 132 and the acting part 137, and the engaging portion 137a is slid over the inclined surface 108a of the coupling engaging portion 108. When the engaging portion 137a is slid over the inclined surface 108a, the coupling protrusion 135 is elastically deformed in a direction in which the engaging portion 137a is moved away from the coupling tube part 132. When a lower edge of the engaging portion 137a reaches an upper edge of the inclined surface 108a, the coupling protrusion 135 is elastically restored and the engaging portion 137a is engaged with the engaging surface 108b.

The joint 103B is coupled to the nozzle holder 102 as the coupling tube part 132 is inserted into the joint coupling part 107 and the engaging portion 137a is engaged with the engaging surface 108b. In a state where the joint 103B is coupled to the nozzle holder 102, sealing between the coupling tube part 132 and the joint coupling part 107 is provided by the sealing ring 114.

Thus, since coupling of the joint 103B to the nozzle holder 102 can be done in one step of inserting the coupling tube part 132 into the joint coupling part 107 from below, the work efficiency of the work of coupling the joint 103B to the nozzle holder 102 can be increased.

On the other hand, the joint 103B can be removed from the nozzle holder 102 by elastically deforming the coupling protrusion 135 so as to disengage the engaging portion 137a from the engaging surface 108b and pulling the coupling tube part 132 downward out of the joint coupling part 107. Here, the coupling protrusion 135 can be elastically deformed by pressing the lower end portion of the acting part 137 toward the coupling tube part 132, which makes it easy to remove the joint 103B from the nozzle holder 102.

Since the vehicular washing device 101B is provided with the nozzle holder 102 that holds the nozzle 104, and the joint 103B is attachable to and detachable from the nozzle holder 102, there is no other member between the nozzle holder 102 and the joint 103B and the number of parts can be reduced.

Further, the joint 103B is provided with the elastically deformable coupling protrusion 135, and the joint 103B is attached to the nozzle holder 102 as the engaging portion 137a of the coupling protrusion 135 is engaged with the coupling engaging portion 108 of the nozzle holder 102.

Thus, the joint 103B is attached to or detached from the nozzle holder 102 as the coupling protrusion 135 is elastically deformed or elastically restored, which makes it easy to perform the work of attaching or detaching the joint 103B to or from the nozzle holder 102.

The pipe coupling member 131 has a substantially cylindrical shape with an axial direction oriented in the up-down direction and has a flange-shaped butting portion 131a projecting outward at a position near an upper end, and a part on an upper side of the butting portion 131a is provided as a fitting part 131b.

The fitting part 131b of the pipe coupling member 131 is inserted and fitted into a lower end portion of the coupling tube part 132 of the holder coupling member 130, and is coupled to the holder coupling member 130 with the butting portion 131a butted against a lower surface of the coupling tube part 132.

The supply pipe 150, such as a hose, is coupled to the pipe coupling member 131 of the joint 103B. A fluid, such as washing water or a washing liquid, is supplied from a supply tank (not shown) to the supply pipe 150, and the fluid supplied flows toward the nozzle 104 sequentially through the pipe coupling member 131 and the holder coupling member 130.

The holder coupling member 130 and the pipe coupling member 131 may be integrally formed, and the joint 103B may be provided as one member.

A valve 138 is disposed inside the holder coupling member 130. The valve 138 is made of an elastically deformable rubber material etc., and is disposed in a space between the partition plate 133 of the holder coupling member 130 and the pipe coupling member 131.

The valve 138 has a cylindrical pressing tube part 139 with an axial direction oriented in the up-down direction, a first inclined part 140 which is continuous with a lower end of the pressing tube part 139 and of which the diameter increases downward, a second inclined part 141 which is continuous with an upper end of the pressing tube part 139 and of which the diameter increases upward, a flange-shaped first pressed part 142 projecting outward from a lower end portion of the first inclined part 140, and a flange-shaped second pressed part 143 projecting outward from an upper end portion of the second inclined part 141.

Figure 22:
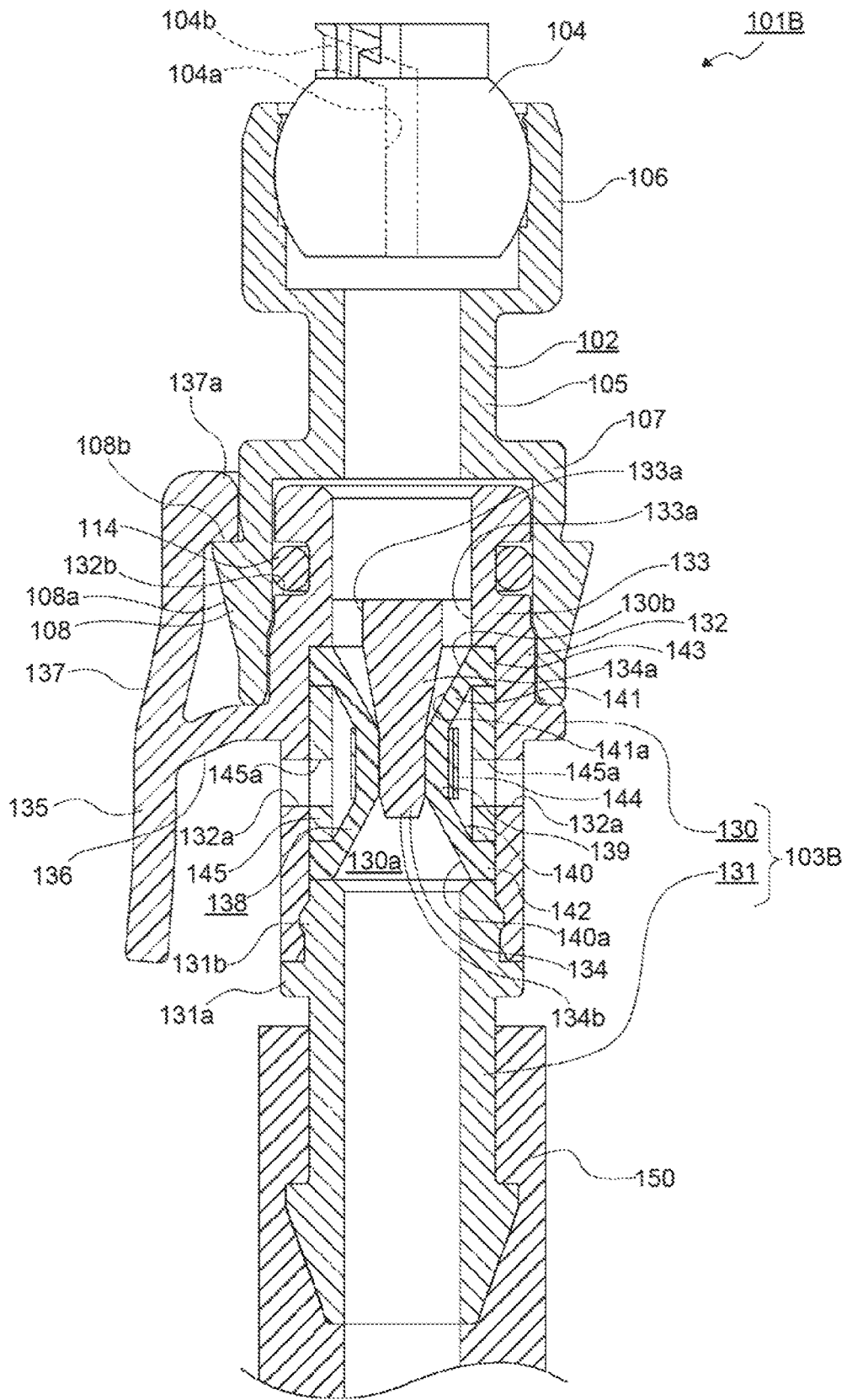
FIG. 22 is a sectional view of the vehicular washing device.
Figure 23:
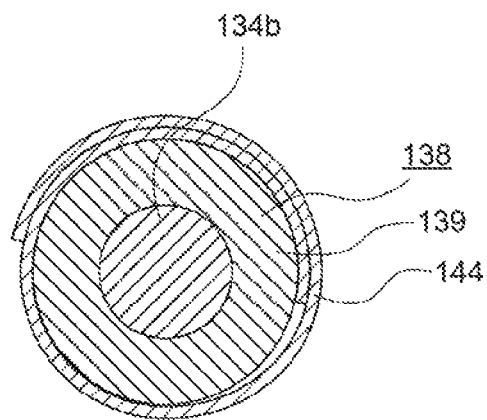
FIG. 23 is a sectional view showing a state before a pressing tube part of a valve is elastically deformed in a diameter increasing direction.
Figure 24:
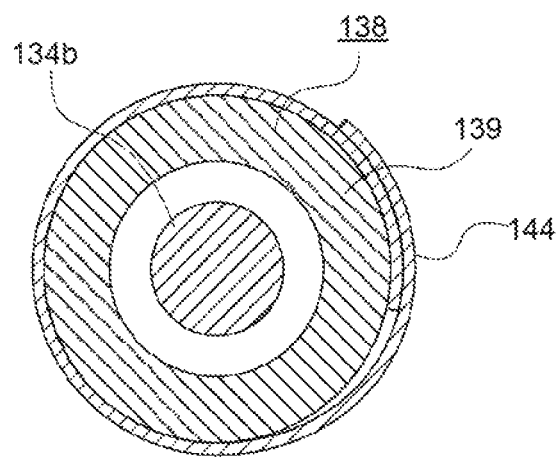
FIG. 24 is a sectional view showing a state where the pressing tube part of the valve is elastically deformed in the diameter increasing direction.
Figure 25:
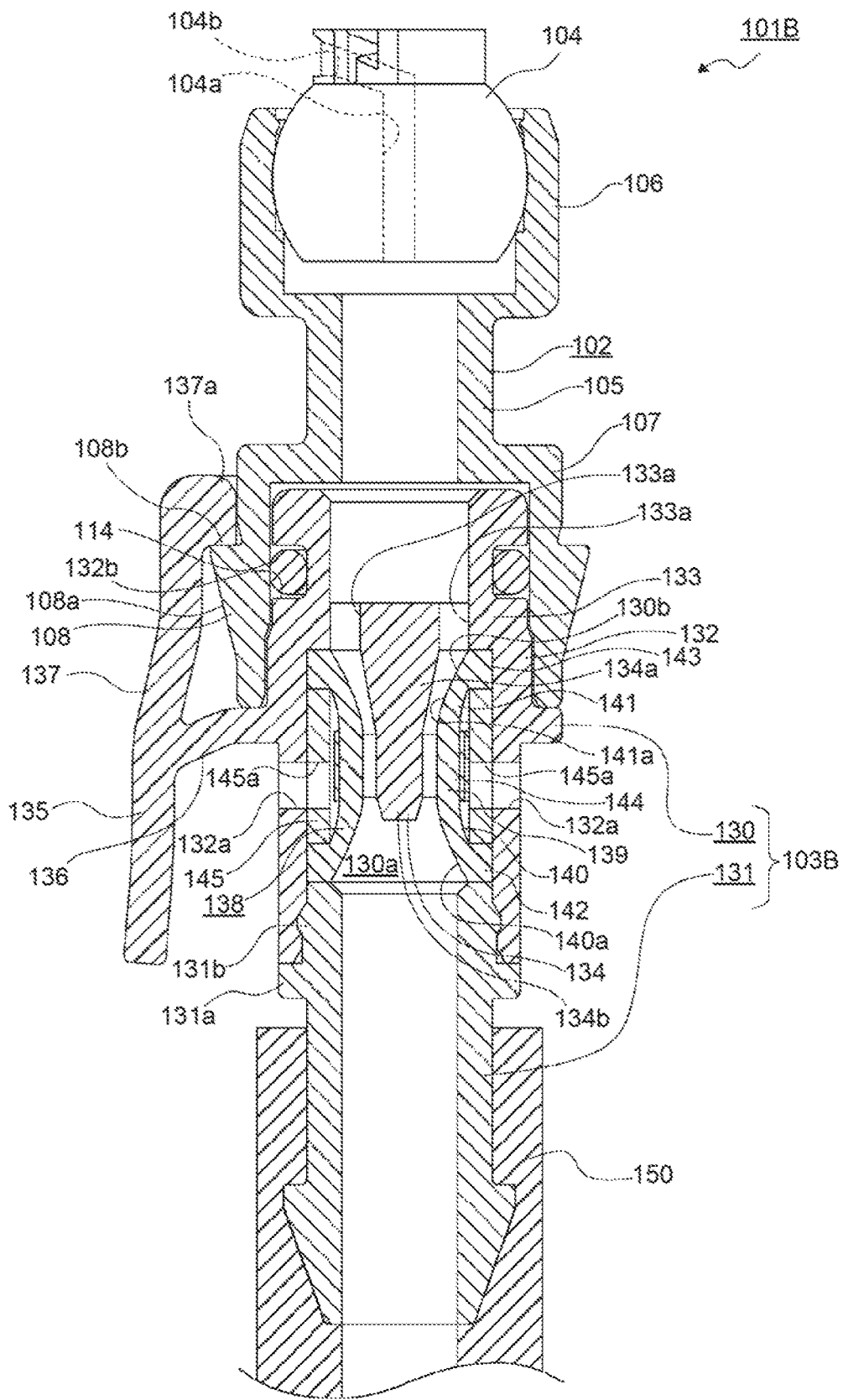
FIG. 25 is a sectional view showing a state where the valve is activated and a flow passage is opened.

The valve 138 is elastically deformable in a direction in which the diameter of the pressing tube part 139 changes, and when a force in a diameter decreasing direction that is larger than a force in a diameter increasing direction acts on the pressing tube part 139, the pressing tube part 139 is brought into close contact with the pressed part 134b of the shaft 134 (see FIG. 22 and FIG. 23).

In a state where the valve 138 is disposed inside the holder coupling member 130, an internal space of the holder coupling member 130 is divided into a first flow passage 130a on a lower side of the pressing tube part 139 and a second flow passage 130b on an upper side of the pressing tube part 139.

An urging spring 144 is wound around the pressing tube part 139 of the valve 138. The urging spring 144 urges the pressing tube part 139 in the diameter decreasing direction, and for example, a leaf spring having a substantially cylindrical shape is used as the urging spring 144.

A spacer 145 is disposed inside the holder coupling member 130. The spacer 145 has a cylindrical shape, and has circulation holes 145a, 145a on opposite sides in a circumferential direction. The spacer 145 is disposed with an outer peripheral surface in close contact with an inner peripheral surface of the coupling tube part 132 of the holder coupling member 130, and the circulation holes 145a, 145a coincide respectively with the air circulation holes 132a, 132a of the coupling tube part 132.

As the spacer 145 is disposed inside the holder coupling member 130, the first pressed part 142 of the valve 138 is pressed from above and below by a lower surface of the spacer 145 and an upper surface of the pipe coupling member 131 while the second pressed part 143 thereof is pressed from above and below by a lower surface of the partition plate 133 and an upper surface of the spacer 145.

In the vehicular washing device 101B thus configured, when the fluid is supplied from the supply tank to the pipe coupling member 131 through the supply pipe 150, the fluid flows to the first flow passage 130a of the holder coupling member 130 and heads for the valve 138.

Here, outside air is taken into an outer peripheral side of the valve 138 inside the holder coupling member 130 through the air circulation holes 132a, 132a of the coupling tube part 132 and the circulation holes 145a, 145a of the spacer 145, and as the fluid heads for the valve 138, the pressure (internal pressure) of the first flow passage 130a becomes higher than the atmospheric pressure. Therefore, the valve 138 is elastically deformed in the diameter increasing direction of the pressing tube part 139 against the urging force of the urging spring 144 (see FIG. 24 and FIG. 25), creating a gap between an inner peripheral surface of the pressing tube part 139 and an outer peripheral surface of the pressed part 134b of the shaft 134, through which the fluid flows from the first flow passage 130a toward the second flow passage 130b.

When the fluid flows through the first flow passage 130a and heads for the pressing tube part 139 of the valve 138, the fluid is guided by an inclined surface 140a on an inner side of the first inclined part 140 of the valve 138 and flows toward the outer peripheral side of the pressed part 134b of the shaft 134.

Thus, the first inclined part 140 makes it more likely that the pressure (internal pressure) of the first flow passage 130a raised due to the flow of the fluid acts on the pressing tube part 139, so that deformation of the pressing tube part 139 in the direction in which the diameter changes can be achieved more reliably by a simple configuration.

The fluid having flowed toward the second flow passage 130b flows into the discharge space 104a of the nozzle 104 and is sprayed through the discharge opening 104b toward an object to be washed, such as a vehicular lamp, and the object to be washed is washed with the sprayed fluid.

When supply of the fluid from the supply tank stops, the pressure inside the holder coupling member 130 decreases and the valve 138 and the urging spring 144 are elastically restored, so that the pressing tube part 139 is brought into close contact with the pressed part 134b of the shaft 134 (see FIG. 22) and spraying of the fluid from the nozzle 104 stops. The pressing tube part 139 is brought into close contact with the pressed part 134b not only by elastic restoration of the valve 138 due to the difference between the pressure inside the holder coupling member 130 and the atmospheric pressure but also by the urging force exerted by the urging spring 144 on the pressing tube part 139.

Thus, the vehicular washing device 101B is provided with the urging spring 144 that urges the pressing tube part 139 in the diameter decreasing direction. Therefore, the pressing tube part 139 is brought into close contact with the shaft 134 also by the urging force of the urging spring 144, which makes it possible to prevent unintended spraying of the fluid from the nozzle 104 by reliably bringing the pressing tube part 139 into close contact with the shaft 134 when washing is not performed, as well as to easily control the pressures of the first flow passage 130a and the second flow passage 130b.

On the other hand, the fluid may remain in a space from the nozzle 104 to the valve 138 in the vehicular washing device 101B, and the remaining fluid may expand due to freezing etc. in a cold region or the like. If the fluid thus expands, the pressure (internal pressure) of the second flow passage 130b becomes higher than the atmospheric pressure, so that the valve 138 is elastically deformed in the diameter increasing direction of the pressing tube part 139 against the urging force of the urging spring 144 (see FIG. 25), creating a gap between the inner peripheral surface of the pressing tube part 139 and the outer peripheral surface of the pressed part 134b of the shaft 134, through which the fluid can flow from the second flow passage 130b toward the first flow passage 130a. Here, the fluid is guided by an inclined surface 141a on an inner side of the second inclined part 141 of the valve 138 and can flow toward the outer peripheral side of the pressed part 134b of the shaft 134.

Thus, when the fluid expands, a gap is created between the inner peripheral surface of the pressing tube part 139 and the outer peripheral surface of the pressed part 134b of the shaft 134, and the fluid can flow through this gap from the second flow passage 130b toward the first flow passage 130a. As a result, the pressure on the parts of the valve 138 and the holder coupling member 130 decreases, so that damage or breakage of the valve 138 and the holder coupling member 130 does not occur.

When the fluid heads from the second flow passage 130b toward the pressing tube part 139 of the valve 138, the fluid is guided by the inclined surface 141a on the inner side of the second inclined part 141 of the valve 138 and flows toward the outer peripheral side of the pressed part 134b of the shaft 134.

Thus, the second inclined part 141 makes it more likely that the pressure (internal pressure) of the second flow passage 130b raised due to the flow of the fluid acts on the pressing tube part 139, so that deformation of the pressing tube part 139 in the direction in which the diameter changes can be achieved more reliably by a simple configuration.

When freezing etc. of the fluid disappears and the pressure of the second flow passage 130b decreases, the valve 138 and the urging spring 144 are elastically restored and the pressing tube part 139 returns to its original state of being in close contact with the pressed part 134b of the shaft 134 (see FIG. 22).

Some vehicular washing devices have a nozzle that is provided on a leading end side and sprays a fluid, a valve disposed in a flow passage of the fluid, and a joint to which a supply pipe, such as a hose, is coupled (e.g., see Patent Literature 2). If such a vehicular washing device has a nozzle unit with a valve disposed therein, a joint to which a supply pipe is connected, a holder coupled to the nozzle unit, etc., the number of parts is so large that downsizing may be hindered and assembling the parts may take many man-hours. Therefore, the vehicular washing devices 101, 101A, 101B of the present invention are desired to achieve a reduction in the number of parts and simplification of the structure.

As has been described above, the vehicular washing devices 101, 101A, 101B include the nozzle 104 that sprays the fluid toward the object to be washed, the joints 103, 103A, 103B of which the internal space is the flow passage of the fluid and to which the supply pipe 150 is coupled, the supply pipe 150 being supplied with the fluid, and the valves 118, 138 that open and close the flow passage of the fluid, and the valves 118, 138 are disposed inside the joints 103, 103A, 103B.

Thus, since the supply pipe 150 is coupled to the joints 103, 103A, 103B and the valves 118, 138 are disposed inside the joints 103, 103A, 103B, the member to which the supply pipe 150 is coupled and the member in which the valves 118, 138 are disposed are the same member. Thus, it is possible to reduce the number of parts and to simplify the structure.

Next, a vehicular washing device 201 according to a sixth embodiment will be described (see FIG. 26 through FIG. 30).

In the vehicular washing device according to the sixth embodiment shown below, a valve is moved in an expanding-contracting direction of a spring in a state of being urged by the spring. In the following description, frontward, rearward, upward, downward, leftward, and rightward directions will be indicated by setting a moving direction of the valve to an up-down direction. However, the frontward, rearward, upward, downward, leftward, and rightward directions indicated below are for the convenience of description, and implementation of the present invention is not limited to these directions.

Figure 26:
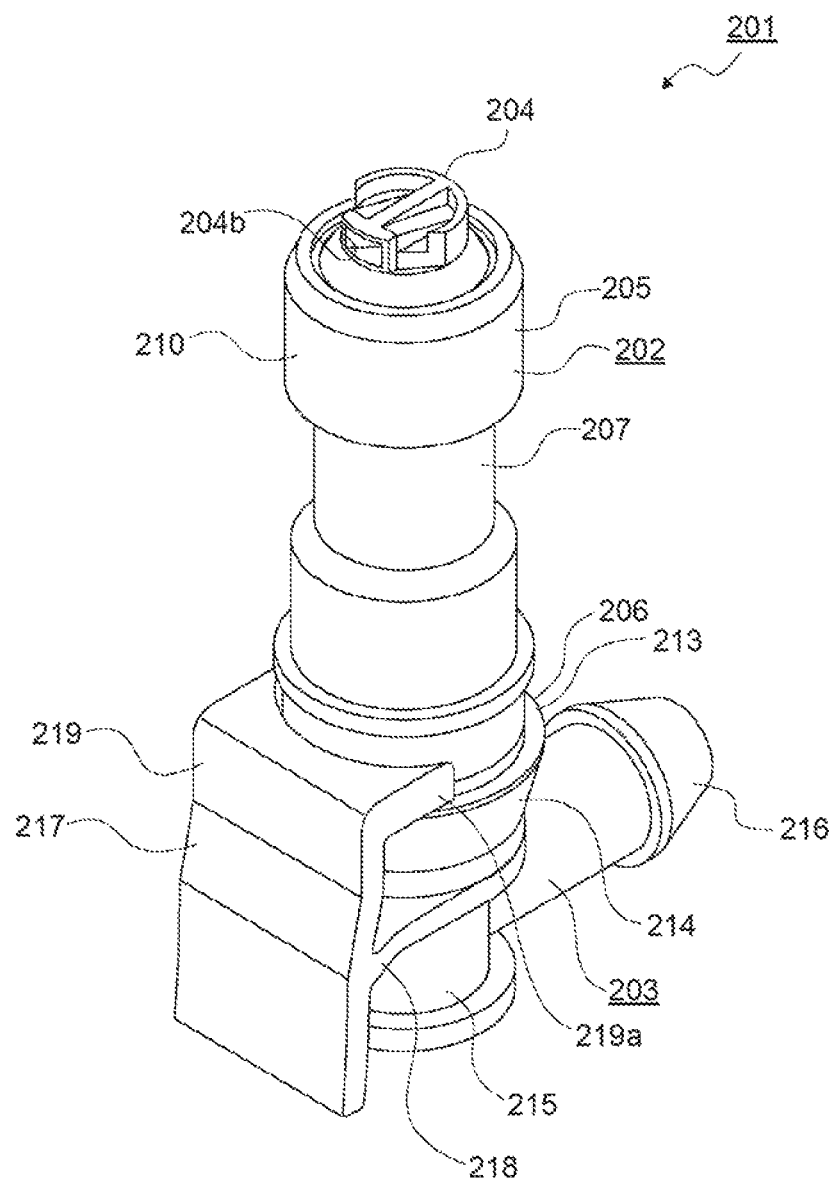
FIG. 26 Showing a sixth embodiment of the vehicular washing device of the present invention along with FIG. 27 through FIG. 30.
Figure 27:
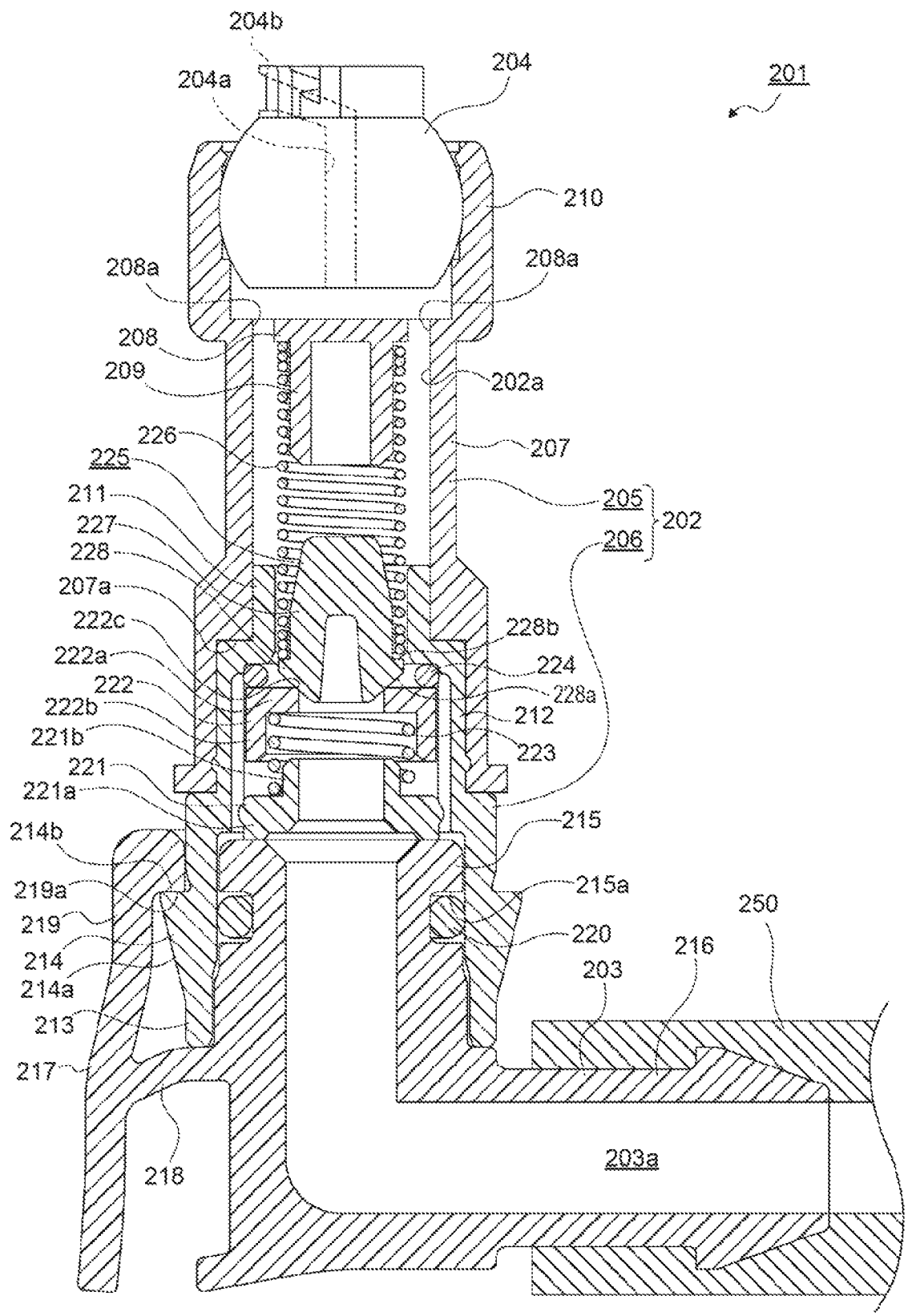
FIG. 27 is a sectional view of the vehicular washing device.
Figure 28:
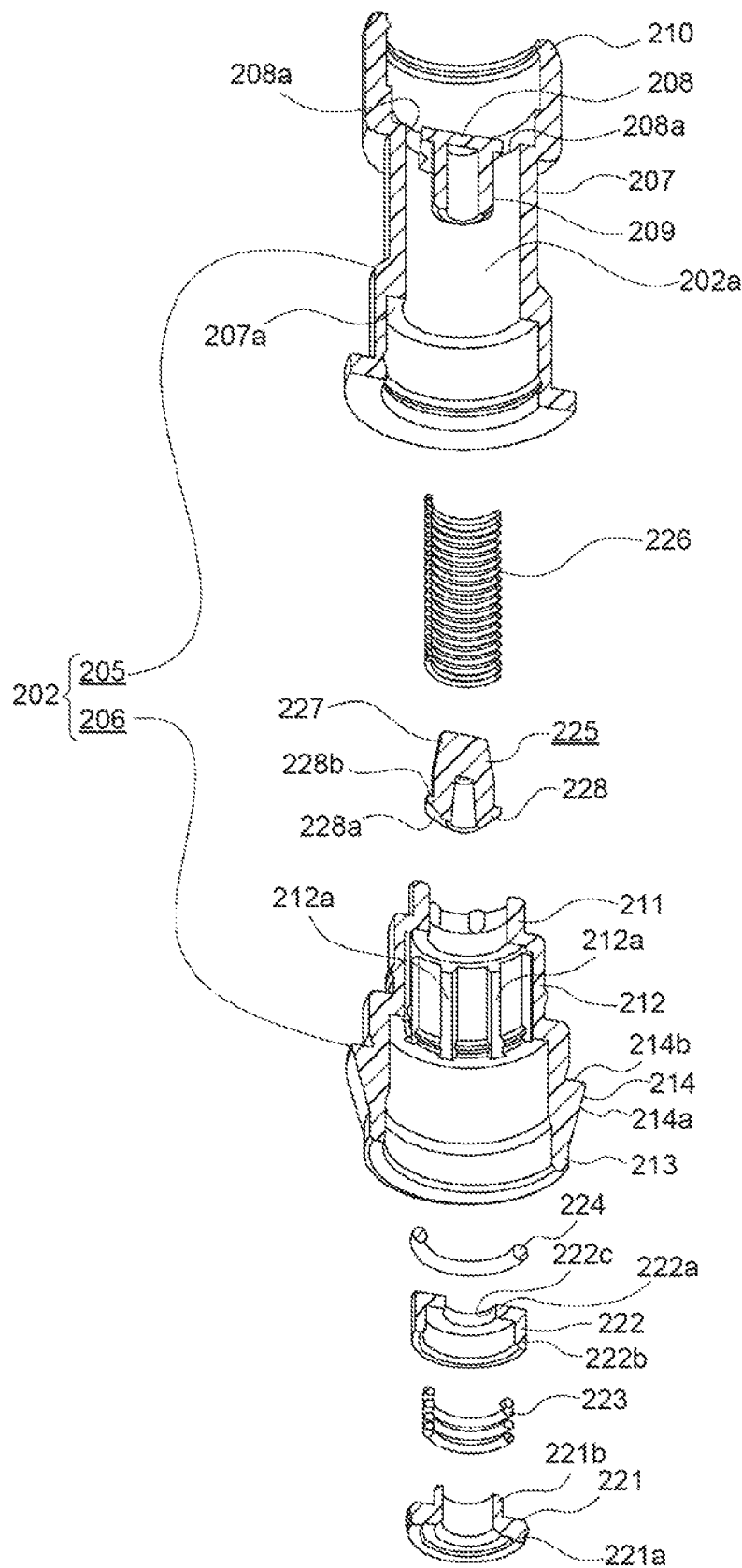
FIG. 28 is an exploded perspective view showing an internal structure etc. as sectioned.
Figure 29:
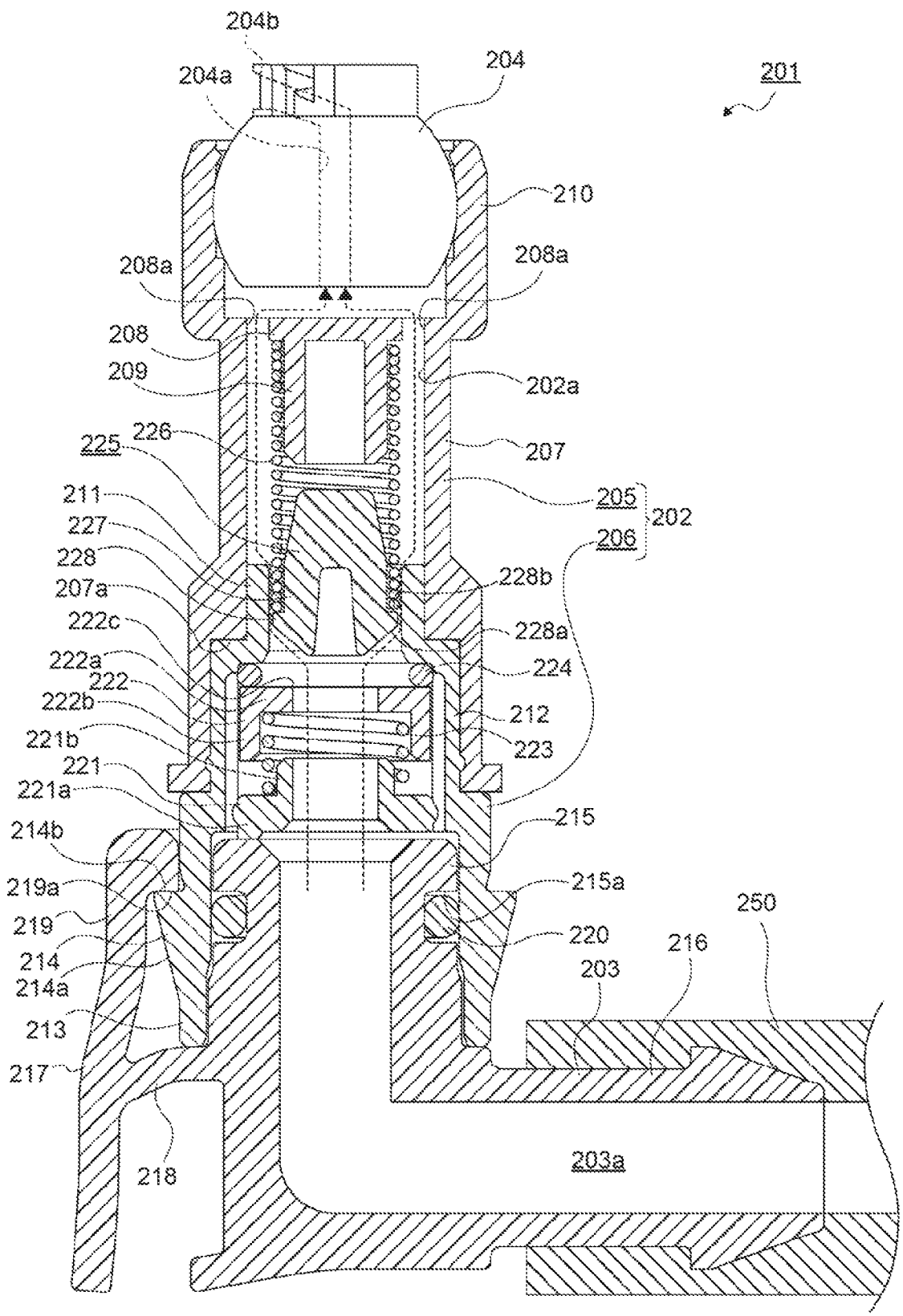
FIG. 29 is a sectional view showing a state where a fluid flows toward a nozzle and a valve is moved in a first direction.

The vehicular washing device 201 has a flow passage forming body 202, a joint 203, and a nozzle 204 (see FIG. 26 through FIG. 28).

The flow passage forming body 202 is formed by connecting a nozzle holder 205 and a coupling member 206 to each other. An internal space of the flow passage forming body 202 is formed as a flow passage 202a of a fluid.

The nozzle holder 205 has a substantially cylindrical tubular part 207 with an axial direction oriented in the up-down direction, a substantially disc-shaped partition plate 208 that closes an upper-side opening of the tubular part 207, a substantially cylindrical spring supporting part 209 protruding downward from a central portion of the partition plate 208, and a substantially cylindrical nozzle holding part 210 protruding upward from an outer peripheral portion of the partition plate 208. A step surface 207a facing downward is formed in the tubular part 207, at a position near a lower end. Pass-through holes 208a, 208a, ... are formed in the partition plate 208. The nozzle holder 205 is provided with a mounting protrusion (not shown) for a vehicle body or a bumper, for example.

The coupling member 206 has a small-diameter part 211, a medium-diameter part 212, and a large-diameter part 213 that are continuous in this order from an upper side and each have a substantially cylindrical shape. The diameter of the small-diameter part 211 is smaller than the diameter of the medium-diameter part 212, and the diameter of the medium-diameter part 212 is smaller than the diameter of the large-diameter part 213. Flow grooves 212a, 212a, ... extending in the up-down direction are formed in an inner peripheral surface of the medium-diameter part 212 at intervals in a circumferential direction.

The coupling member 206 is provided with an annular coupling engaging portion 214 protruding outward from the large-diameter part 213. The coupling engaging portion 214 has an inclined surface 214a that is an outer surface shifting outward while extending upward, and a ring-shaped engaging surface 214b that is continuous with an upper end of the inclined surface 214a and faces upward.

The coupling member 206 is connected to the nozzle holder 205, with an upper surface of the medium-diameter part 212 butted against the step surface 207a from below and an upper surface of the large-diameter part 213 butted against a lower surface of the tubular part 207 from below.

The nozzle 204 has a spherical outer peripheral surface except for an upper end portion, and has a discharge space 204a formed inside. A discharge opening 204b communicating with the discharge space 204a is formed in the upper end portion of the nozzle 204.

The nozzle 204 is press-fitted in the nozzle holding part 210 of the nozzle holder 205 in a nested state. The nozzle 204 may be rotatable in an arbitrary direction relatively to the nozzle holding part 210. In a state where the nozzle 204 is held by the nozzle holding part 210, the discharge space 204a communicates with an internal space of the nozzle holding part 210.

The joint 203 is coupled to the coupling member 206 of the flow passage forming body 202. The joint 203 is attachable to and detachable from the coupling member 206. An internal space of the joint 203 is formed as a flow passage 203a. The joint 203 has a coupling tube part 215 extending in the up-down direction, a pipe coupling part 216 protruding rearward from a lower end portion of the coupling tube part 215, and a coupling protrusion 217 continuous with the coupling tube part 215.

A ring insertion groove 215a extending in a circumferential direction is formed in the coupling tube part 215, at a position near an upper end. An internal space of the pipe coupling part 216 communicates with an internal space of the coupling tube part 215.

The coupling protrusion 217 has an arm 218 protruding frontward from the coupling tube part 215 and an acting part 219 continuous with a leading end portion of the arm 218, and a central portion of the acting part 219 in the up-down direction is continuous with the arm 218. An engaging portion 219a protruding toward the coupling tube part 215 is provided at an upper end portion of the acting part 219. The coupling protrusion 217 is elastically deformable in directions in which upper and lower end portions of the acting part 219 are moved closer to and away from the coupling tube part 215.

A sealing ring 220 made of rubber etc. is inserted in the ring insertion groove 215a of the coupling tube part 215.

The joint 203 is coupled to the coupling member 206 from below, and coupling of the joint 203 to the coupling member 206 is done by inserting the coupling tube part 215 into the large-diameter part 213 of the coupling member 206. To insert the coupling tube part 215 into the large-diameter part 213, a portion of the large-diameter part 213 is inserted between the coupling tube part 215 and the acting part 219, and the engaging portion 219a is slid over the inclined surface 214a of the coupling engaging portion 214. When the engaging portion 219a is slid over the inclined surface 214a, the coupling protrusion 217 is elastically deformed in a direction in which the engaging portion 219a is moved away from the coupling tube part 215. When a lower edge of the engaging portion 219a reaches an upper edge of the inclined surface 214a, the coupling protrusion 217 is elastically restored and the engaging portion 219a is engaged with the engaging surface 214b.

The joint 203 is coupled to the coupling member 206 as the coupling tube part 215 is inserted into the large-diameter part 213 and the engaging portion 219a is engaged with the engaging surface 214b. In a state where the joint 203 is coupled to the coupling member 206, sealing between the coupling tube part 215 and the large-diameter part 213 is provided by the sealing ring 220.

Thus, since coupling of the joint 203 to the flow passage forming body 202 can be done in one step of inserting the coupling tube part 215 into the large-diameter part 213 from below, the work efficiency of the work of coupling the joint 203 to the flow passage forming body 202 can be increased.

On the other hand, the joint 203 can be removed from the flow passage forming body 202 by elastically deforming the coupling protrusion 217 so as to disengage the engaging portion 219a from the engaging surface 214b and pulling the coupling tube part 215 downward out of the large-diameter part 213. Here, the coupling protrusion 217 can be elastically deformed by pressing the lower end portion of the acting part 219 toward the coupling tube part 215, which makes it easy to remove the joint 203 from the flow passage forming body 202.

A supply pipe 250, such as a hose, is coupled to the pipe coupling part 216 of the joint 203. A fluid, such as washing water or a washing liquid, is supplied from a supply tank (not shown) to the supply pipe 250, and the fluid supplied flows from the flow passage 203a of the joint 203 toward the nozzle 204 through the flow passage 202a of the flow passage forming body 202.

A spring bearing plate 221, a valve seat 222, and a first spring 223 are disposed inside the flow passage forming body 202.

The spring bearing plate 221 has a substantially ring-shaped spring bearing part 221a with an axial direction oriented in the up-down direction and an insertion part 221b protruding upward from an inner peripheral portion of the spring bearing part 221a, and is disposed with a lower surface of the spring bearing part 221a in contact with an upper surface of the coupling tube part 215 of the joint 203.

The valve seat 222 is located above the spring bearing plate 221 and movable in the up-down direction. The valve seat 222 has a ring-shaped spring supporting part 222a with an axial direction oriented in the up-down direction and a peripheral surface part 222b protruding downward from an outer peripheral portion of the spring supporting part 222a.

The first spring 223 is a helical compression spring, for example, and is disposed with upper and lower end portions pressed respectively against the spring supporting part 222a of the valve seat 222 and the spring bearing part 221a of the spring bearing plate 221. The insertion part 221b of the spring bearing plate 221 is inserted into a lower end portion of the first spring 223, and the peripheral surface part 222b of the valve seat 222 is located on an outer peripheral side of an upper end portion of the first spring 223.

The valve seat 222 is urged in an upward direction (first direction) by the first spring 223. An O-ring 224 is disposed between an upper surface of the valve seat 222 and a lower surface of the small-diameter part 211 of the coupling member 206, and the valve seat 222 is pressed against the O-ring 224 by an urging force of the first spring 223. Thus, a gap between the valve seat 222 and the small-diameter part 211 is sealed by the O-ring 224.

The valve seat 222 and the first spring 223 are located inside the medium-diameter part 212 of the coupling member 206.

A valve 225 and a second spring 226 are disposed inside the flow passage forming body 202.

The valve 225 is located above the valve seat 222 and movable in the up-down direction. The valve 225 has a base part 227 having a substantially cylindrical outer shape with an axial direction oriented in the up-down direction, and an opening-closing part 228 continuous with a lower end of the base part 227.

The opening-closing part 228 has an inclined contact surface 228a and a spring bearing surface 228b, and the inclined contact surface 228a is located below the spring bearing surface 228b. The inclined contact surface 228a is inclined so as to shift upward while extending outward from a position in a lower end of the opening-closing part 228 near an outer periphery, and has an annular shape. The spring bearing surface 228b is continuous with a lower end of an outer peripheral surface of the base part 227 and formed so as to face upward on an outer peripheral side of the base part 227.

The valve 225 has a maximum outside diameter that is smaller than the inside diameter of the small-diameter part 211 of the coupling member 206, and is movable in the up-down direction at least inside the small-diameter part 211.

The second spring 226 is a helical compression spring, for example, and is disposed with upper and lower end portions pressed respectively against a lower surface of the partition plate 208 of the nozzle holder 205 and the spring bearing surface 228b of the valve 225. The base part 227 of the valve 225 is inserted into a lower end portion of the second spring 226, and the spring supporting part 209 of the nozzle holder 205 is inserted into an upper end portion of the second spring 226.

The valve 225 is urged in a downward direction (second direction) by the second spring 226. The inclined contact surface 228a of the valve 225 is pressed by the urging force of the second spring 226 against an opening edge of an opening 222c formed at an upper end of the valve seat 222, and thus the opening 222c is closed. A portion of the opening-closing part 228 of the valve 225 is inserted into the valve seat 222 with the inclined contact surface 228a pressed against the opening 222c.

The spring force of the first spring 223 is larger than the spring force of the second spring 226. Therefore, in a state where a downward force is not applied to the valve seat 222, the opening 222c is closed by the valve 225 with the valve seat 222 being located at an upper end of movement.

In the vehicular washing device 201 thus configured, when the fluid is supplied from the supply tank to the flow passage 203a of the joint 203 through the supply pipe 250, the fluid flows from the flow passage 203a to the flow passage 202a of the flow passage forming body 202 and passes through an inside of the spring bearing plate 221, the valve seat 222, and the O-ring 224 to head for the valve 225.

As the fluid heads for the valve 225, the pressure of the fluid is applied to the valve 225 and the second spring 226 is compressed. As a result, the valve 225 is moved in the first direction against the urging force of the second spring 226, and the inclined contact surface 228a of the opening-closing part 228 is moved away from the valve seat 222 (see FIG. 29). As the inclined contact surface 228a is moved away from the valve seat 222, the opening 222c of the valve seat 222 is opened.

When the valve 225 is moved to open the opening 222c, the fluid having passed through the opening 222c flows on an outer peripheral side of the valve 225 and flows from the flow passage 202a to the discharge space 204a of the nozzle 204 and is sprayed through the discharge opening 204b toward an object to be washed, such as a vehicular lamp, and the object to be washed is washed with the sprayed fluid.

When supply of the fluid from the supply tank stops, the pressure of the fluid on the valve 225 decreases, so that the second spring 226 expands and the valve 225 is moved in the second direction. As a result, the opening-closing part 228 is pressed against the valve seat 222 to close the opening 222c, and spraying of the fluid from the nozzle 204 stops.

On the other hand, the fluid may remain in a space from the nozzle 204 to the valve 225 in the vehicular washing device 201, and the remaining fluid may expand due to freezing etc. in a cold region or the like. If the fluid thus expands, the pressure of the fluid is applied to the valve 225 from above, and a force that moves the valve 225 in the second direction acts thereon and the force is transmitted from the valve 225 to the valve seat 222.

Figure 30:
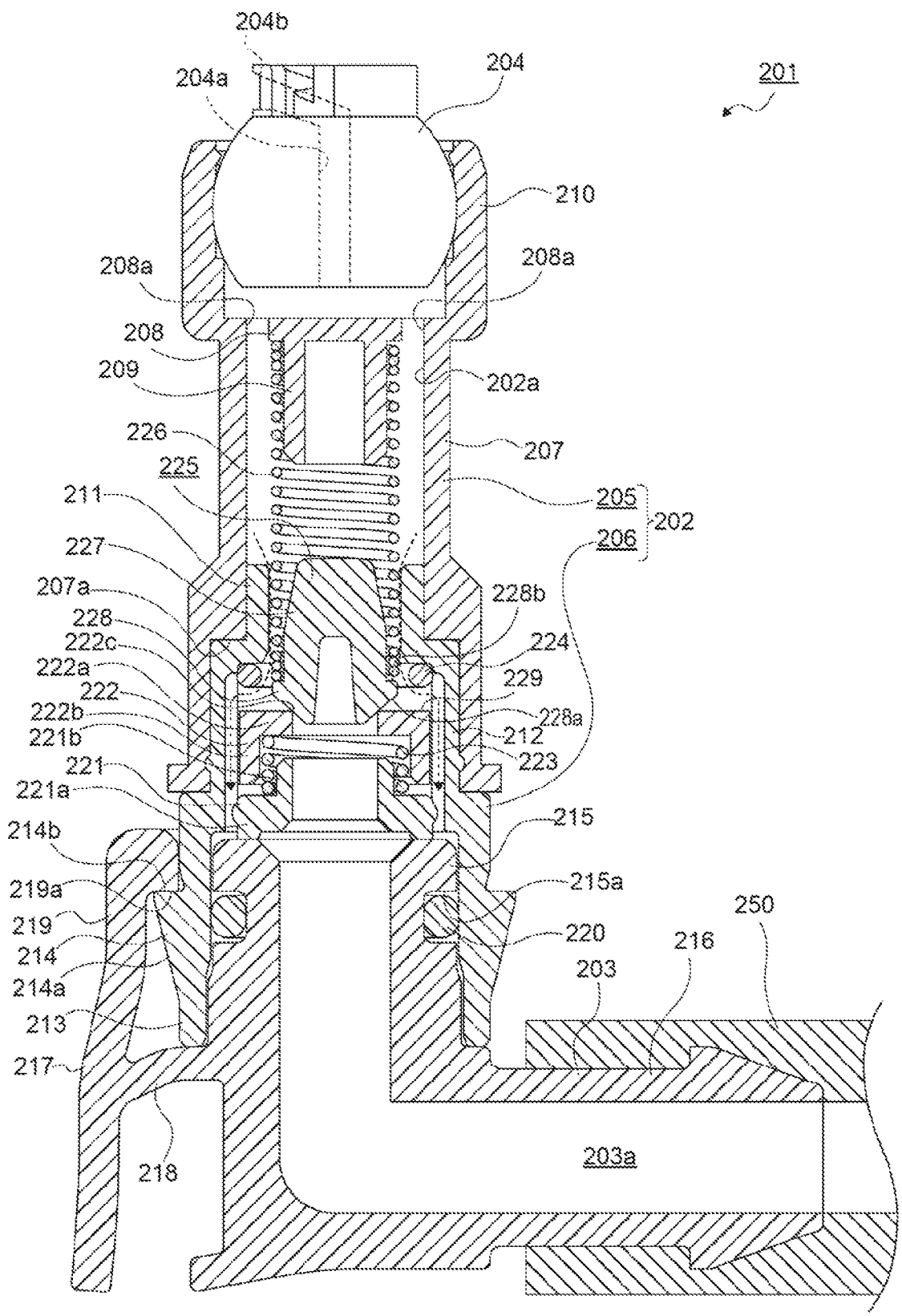
FIG. 30 is a sectional view showing a state where the fluid expands and the valve is moved in a second direction.

When the force due to expansion of the fluid is transmitted from the valve 225 to the valve seat 222, the valve seat 222 is moved in the second direction against the urging force of the first spring 223 (see FIG. 30). When the valve seat 222 is moved in the second direction, a space 229 communicating with the gap between the valve 225 and the small-diameter part 211 is created above the valve seat 222, and the expanded fluid can flow from the gap between the valve 225 and the small-diameter part 211 to a gap between the medium-diameter part 212 and the valve seat 222 through the space 229.

As a result, the pressure on the parts of the valve 225 and the flow passage forming body 202 decreases, so that damage or breakage of the valve 225 and the flow passage forming body 202 does not occur.

Since the flow grooves 212a, 212a, . . . are formed in the medium-diameter part 212, the fluid is more likely to flow through the gap between the medium-diameter part 212 and the valve seat 222, and the pressure on the parts of the valve 225 and the flow passage forming body 202 decreases quickly and reliably.

When freezing etc. of the fluid disappears and the pressure on the valve 225 and others decreases, the valve seat 222 and the valve 225 are integrally moved in the first direction by the urging force of the first spring 223, and the valve seat 222 returns to its original state of being pressed against the lower surface of the small-diameter part 211 through the O-ring 224 (see FIG. 27).

Next, a vehicular washing device 201A according to a seventh embodiment will be described (see FIG. 31 through FIG. 33).

Compared with the vehicular washing device 201 described above, the vehicular washing device 201A shown below is different in that it has a piston and a cylinder and that a fluid is discharged from a nozzle in a state where the piston has been moved to an end of movement in a protruding direction relatively to the cylinder, but the basic internal structure is the same as that of the vehicular washing device 201. Therefore, for the vehicular washing device 201A, only those parts that are different from the vehicular washing device 201 will be described in detail, while the other parts will be denoted by the same reference signs as the same parts of the vehicular washing device 201 and the description thereof will be omitted.

In the description of the vehicular washing device according to the seventh embodiment shown below, frontward, rearward, upward, downward, leftward, and rightward directions will be indicated by setting a moving direction of a valve to a front-rear direction. However, the frontward, rearward, upward, downward, leftward, and rightward directions indicated below are for the convenience of description, and implementation of the present invention is not limited to these directions.

Figure 31:
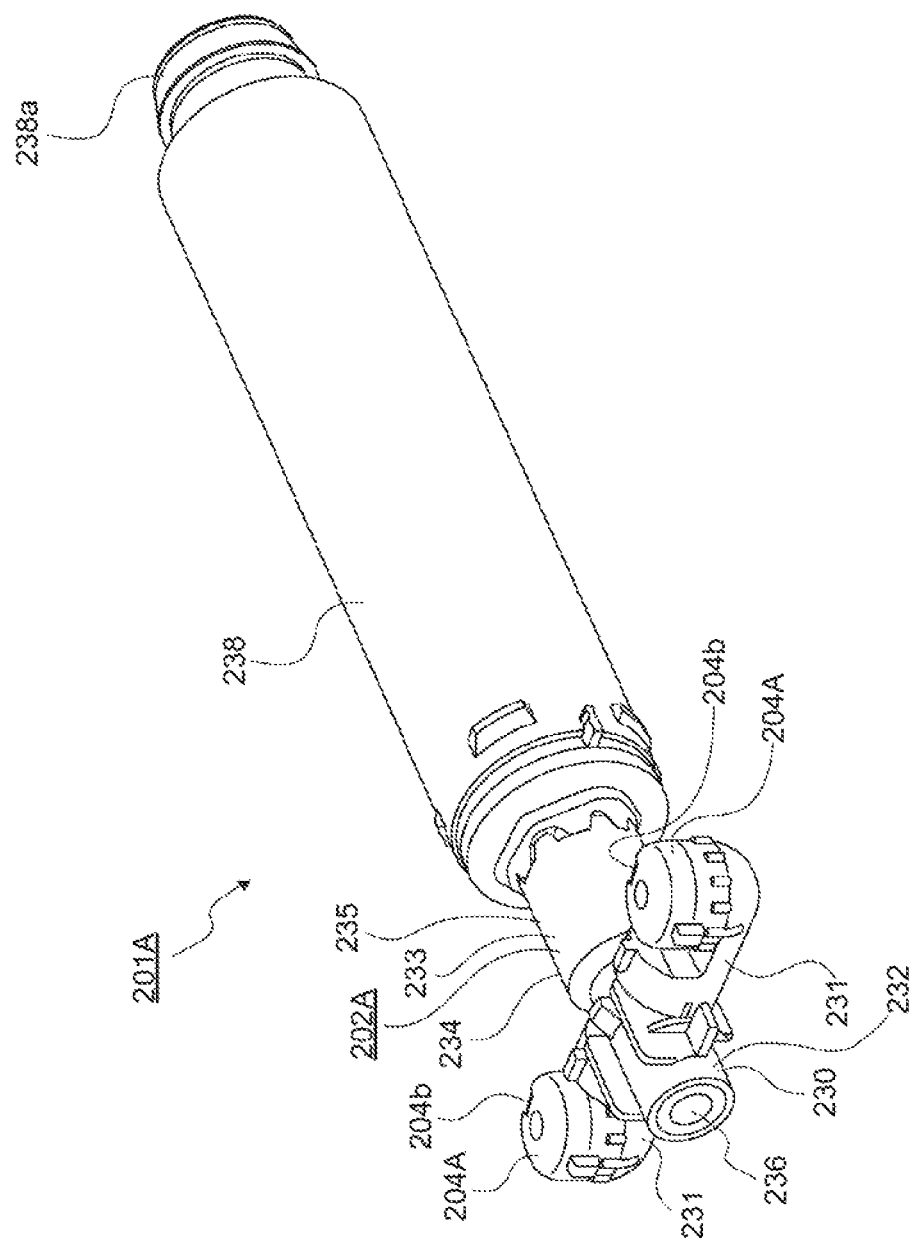
FIG. 31 Showing a seventh embodiment of the vehicular washing device of the present invention along with FIG. 32 and FIG. 33.
Figure 32:
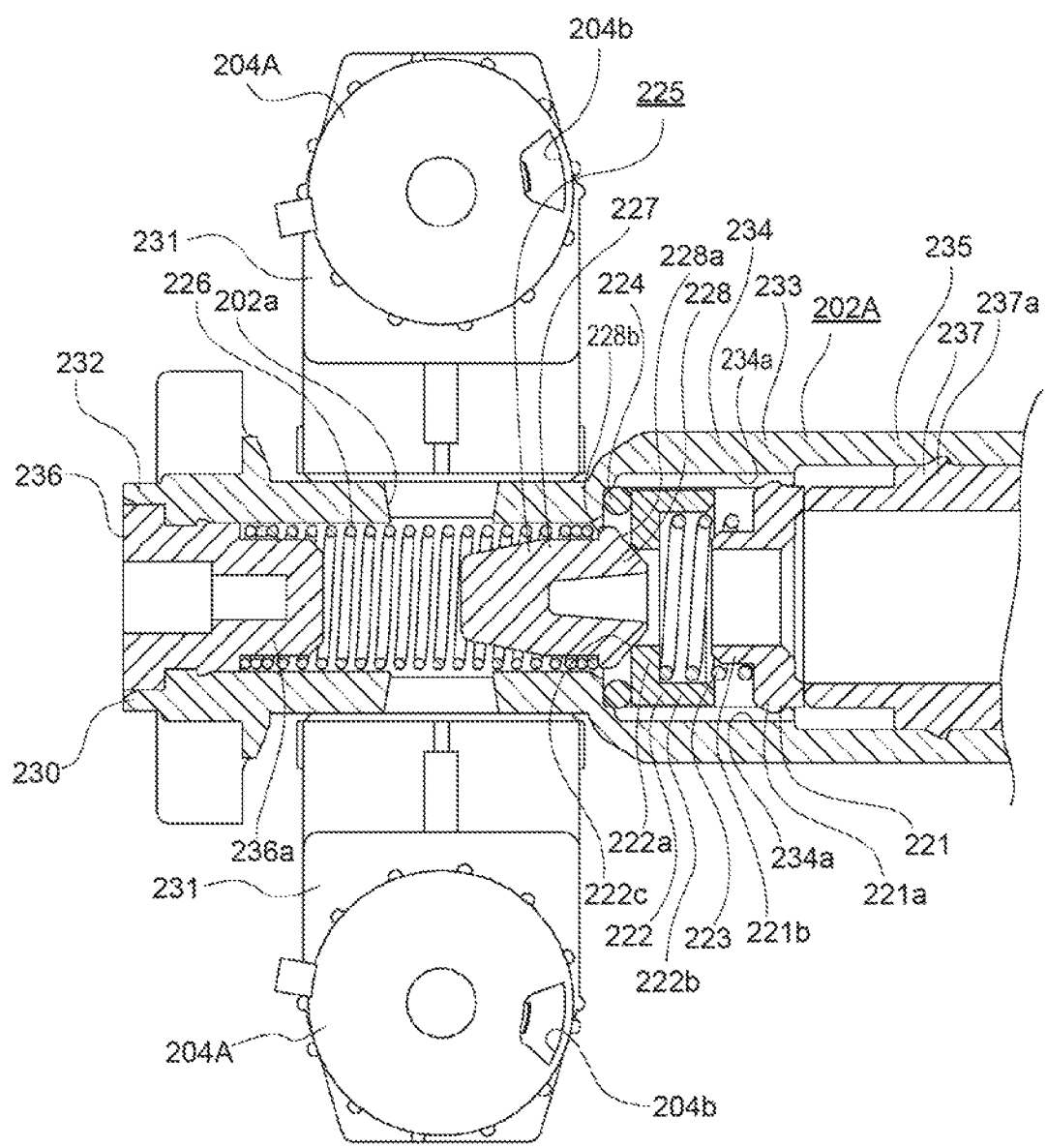
FIG. 32 is a sectional view of the vehicular washing device.

The vehicular washing device 201A has a flow passage forming body 202A and nozzles 204A, 204A (see FIG. 31 and FIG. 32). The vehicular washing device 201A is not provided with the joint 203.

The flow passage forming body 202A has a coupling part 230 having a substantially cylindrical shape and nozzle holding parts 231, 231 protruding toward opposite sides from the coupling part 230.

In the coupling part 230, a small-diameter portion 232 and a large-diameter portion 233 are continuously formed in this order from a front side, and the diameter of the small-diameter portion 232 is smaller than the diameter of the large-diameter portion 233. Of the large-diameter portion 233, a substantially front half is provided as an installation section 234 while a substantially rear half is provided as a piston coupling section 235. Flow grooves 234a, 234a, . . . extending in the front-rear direction are formed in an inner peripheral surface of the installation section 234.

A cap 236 that closes a front-side opening of the coupling part 230 is attached to the small-diameter portion 232 of the coupling part 230. The cap 236 is provided with a spring supporting part 236a protruding rearward.

The nozzle holding parts 231, 231 protrude respectively leftward and rightward from the small-diameter portion 232, and protrusion directions are oriented so as to be orthogonal to an axial direction of the coupling part 230. The nozzles 204A, 204A are held respectively at leading end portions of the nozzle holding parts 231, 231.

The spring bearing plate 221, the valve seat 222, the first spring 223, the O-ring 224, the valve 225, and the second spring 226 are disposed inside the flow passage forming body 202A. The spring bearing plate 221, the valve seat 222, the first spring 223, and the O-ring 224 are disposed in the installation section 234 of the large-diameter portion 233. The second spring 226 is disposed with front and rear end portions pressed respectively against a portion of the cap 236 and the spring bearing surface 228b of the valve 225, and the spring supporting part 236a of the cap 236 is inserted into a front end portion of the second spring 226.

The piston coupling section 235 of the large-diameter portion 233 of the flow passage forming body 202A is coupled to a piston 237. A front end portion of the piston 237 is provided as a coupling tube portion 237a. A rear end portion of the cylinder 238 is provided as a supply pipe coupling portion 238a. The piston coupling section 235 of the flow passage forming body 202A is coupled to the coupling tube portion 237a.

The supply pipe 250 is coupled to the supply pipe coupling portion 238a of the cylinder 238. A fluid flows from the supply tank to the supply pipe 250, and the fluid having flowed flows from an internal space of the piston 237 toward the nozzles 204A, 204A through the flow passage 202a of the flow passage forming body 202A.

The piston 237 is supported by the cylinder 238 so as to be movable in the front-rear direction. A spring member, for example, an extension coil spring (not shown) is disposed inside the piston 237, and the spring member is supported at one end portion by the piston 237 and at the other end portion by the cylinder 238. Thus, an urging force in a direction in which the piston 237 is drawn into the cylinder 238 is applied to the piston 237 by the spring member, and when no fluid is supplied inside the piston 237, the piston 237 is located at a rear end of a movable range.

In the vehicular washing device 201A thus configured, when the fluid is supplied from the supply tank into the piston 237 through the supply pipe 250, the piston 237 moves under the pressure of the fluid in the protruding direction (a frontward direction) relatively to the cylinder 238 against the urging force of the spring member. When the piston 237 has been moved to a front end of the movable range, the valve 225 moves under the pressure of the fluid in the first direction against the urging force of the second spring 226, so that the inclined contact surface 228a of the opening-closing part 228 is moved away from the valve seat 222. As the inclined contact surface 228a is moved away from the valve seat 222, the opening 222c of the valve seat 222 is opened.

When the valve 225 is moved in the first direction to open the opening 222c, the fluid having passed through the opening 222c flows from the flow passage 202a into the nozzles 204A, 204A by flowing on the outer peripheral side of the valve 225 and is sprayed from the nozzles 204A, 204A toward an object to be washed, such as a vehicular lamp, and the object to be washed is washed with the sprayed fluid.

When supply of the fluid from the supply tank stops, the pressure of the fluid on the valve 225 decreases, and the second spring 226 expands and the valve 225 is moved in the second direction. As a result, the opening-closing part 228 is pressed against the valve seat 222 to close the opening 222c, and spraying of the fluid from the nozzles 204A, 204A stops. Then, as the pressure of the fluid decreases, the spring member is compressed and the piston 237 is moved to the rear end of the movable range in the direction in which the piston 237 is drawn into the cylinder 238.

On the other hand, the fluid may remain in a space from the nozzles 204A, 204A to the valve 225 in the vehicular washing device 201A, and the remaining fluid may expand due to freezing etc. in a cold region or the like. If the fluid thus expands, the pressure of the fluid is applied to the valve 225 from the front side, and a force that moves the valve 225 in the second direction acts thereon and the force is transmitted from the valve 225 to the valve seat 222.

Figure 33:
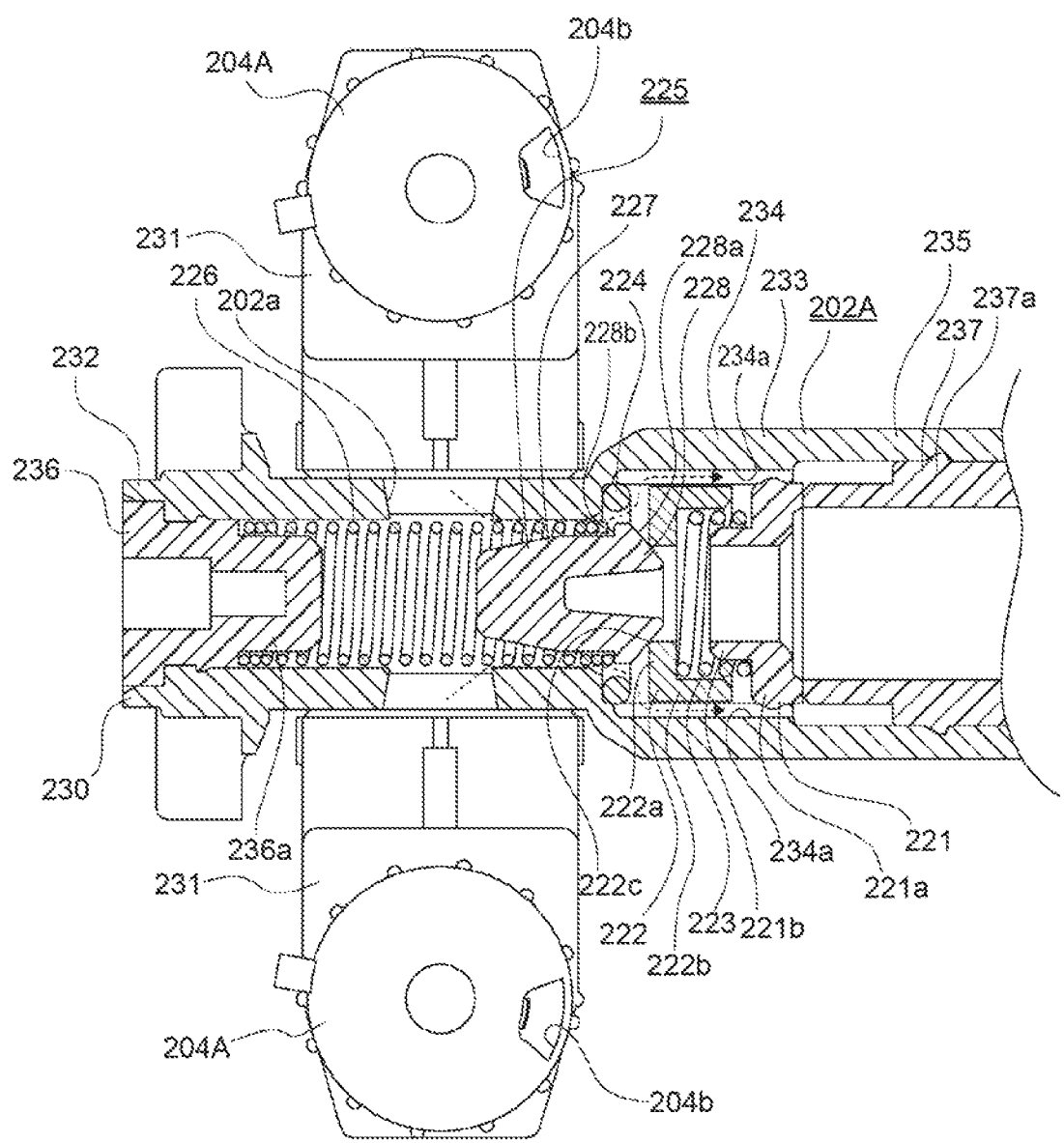
FIG. 33 is a sectional view showing a state where a fluid expands and a valve is moved in a second direction.

When the force due to expansion of the fluid is transmitted from the valve 225 to the valve seat 222, the valve seat 222 is moved in the second direction against the urging force of the first spring 223 (see FIG. 33). When the valve seat 222 is moved in the second direction, the expanded fluid can flow from a gap between the valve 225 and the small-diameter portion 232 to a gap between the large-diameter portion 233 and the valve seat 222 through the space 229.

As a result, the pressure on the parts of the valve 225 and the flow passage forming body 202A decreases, so that damage or breakage of the valve 225 and the flow passage forming body 202A does not occur.

Since the flow grooves 234a, 234a, . . . are formed in the large-diameter portion 233, the fluid is more likely to flow through the gap between the large-diameter portion 233 and the valve seat 222, and the pressure on the parts of the valve 225 and the flow passage forming body 202A decreases quickly and reliably.

When freezing etc. of the fluid disappears and the pressure on the valve 225 and others decreases, the valve seat 222 and the valve 225 are integrally moved by the urging force of the first spring 223, and the valve seat 222 returns to its original state of being pressed against the small-diameter portion 232 through the O-ring 224 (see FIG. 32).

As has been described above, the vehicular washing devices 201, 201A are provided with the valve seat 222 that has the opening 222c and is movable in the first direction and the second direction, the valve 225 that opens the opening 222c by moving in the first direction under the pressure of the fluid, the first spring 223 that urges the valve seat 222 in the first direction and presses the valve seat 222 against the valve 225, and the second spring 226 that urges the valve 225 in the second direction and closes the opening 222c with the valve 225.

Thus, since the valve seat 222 and the valve 225 are urged in directions toward each other by the first spring 223 and the second spring 226, and the valve 225 is moved in the first direction or the second direction according to the state of the pressure applied to the valve 225, a load on the valve due to expansion of the fluid is reduced. Therefore, malfunction due to expansion of the fluid can be eliminated to ensure a normal operating state of the vehicular washing devices 201, 201A.

Since the urging force of the first spring 223 is larger than the urging force of the second spring 226, the valve seat 222 is always retained in a predetermined position when the fluid is not frozen, which can enhance the reliability of the operation in terms of an action of spraying the fluid from the nozzles 204, 204A and an action of stopping spraying.

Further, the O-ring 224 that is located around the valve 225 and restricts the flow of the fluid from the outer peripheral side of the valve seat 222 toward the outer peripheral side of the valve 225 is provided.

Thus, since the fluid does not flow from the outer peripheral side of the valve seat 222 toward the outer peripheral side of the valve 225 when the fluid flows in the first direction, the valve 225 moves reliably in the first direction under the pressure of the fluid applied thereto, allowing the fluid to flow reliably toward the nozzles 204, 204A under high pressure.

Moreover, the flow grooves 212a, 234a extending in the flow direction of the fluid are formed in the inner surfaces of the flow passage forming bodies 202, 202A, on the outer peripheral side of the valve seat 222. Thus, when the valve 225 moves in the second direction as a result of expansion of the fluid, the fluid is allowed to flow smoothly toward the side opposite to the nozzles 204, 204A by flowing through the flow grooves 212a, 234a from the outer peripheral side of the valve 225.

In addition, coil springs are used as the first spring 223 and the second spring 226.

Thus, the inside of each of the first spring 223 and the second spring 226 can be used as a flow space for the fluid, and a smoothly flowing state of the fluid can be ensured. Moreover, the pressure of the fluid is hardly applied to the first spring 223 and the second spring 226, so that an appropriate urging force of each of the first spring 223 and the second spring 226 can be maintained.

REFERENCE SIGNS LIST

1 Vehicular washing device, 2 Flow passage forming body, 2a First flow passage, 2b Second flow passage, 4 Nozzle, 9 Shaft, 21 Valve, 22 Pressing tube part, 23 First inclined part, 24 Second inclined part, 1A Vehicular washing device, 2A Flow passage forming body, 4A Nozzle, 101 Vehicular washing device, 102 Nozzle holder, 102a Flow passage, 103 Joint, 104 Nozzle, 109 Coupling tube part, 110 Pipe coupling part, 111 Coupling protrusion, 118 Valve, 122 Urging spring, 150 Supply pipe, 101A Vehicular washing device, 103A Joint, 109A Coupling tube part, 110A Pipe coupling part, 111A Coupling protrusion, 101B Vehicular washing device, 130a First flow passage, 130b Second flow passage, 103B Joint, 132 Coupling tube part, 135 Coupling protrusion, 201 Vehicular washing device, 202 Flow passage forming body, 202a Flow passage, 204 Nozzle, 212a Flow groove, 222 Valve seat, 222c Opening, 223 First spring, 224 O-ring, 225 Valve, 226 Second spring, 201A Vehicular washing device, 202A Flow passage forming body, 204A Nozzle, 234a Flow groove.

The invention claimed is:

1. A vehicular washing device comprising:
a nozzle that sprays a fluid toward an object to be washed;
a flow passage forming body of which an internal space is a flow passage of the fluid; and
a valve that has a pressing tube part with an axial direction coinciding with a flow direction of the fluid, is elastically deformable in a direction in which a diameter of the pressing tube part changes, and opens and closes the flow passage according to a state of deformation, wherein:
a first flow passage and a second flow passage are formed as the flow passage on opposite sides of the pressing tube part;
a shaft with which the pressing tube part is capable of coming into close contact is located inside the valve; and
the valve deforms elastically according to a magnitude of a pressure of the first flow passage or a pressure of the second flow passage relative to an atmospheric pressure.

2. The vehicular washing device according to claim 1, wherein:
the valve is provided with a first inclined part and a second inclined part that are continuous with both ends of the pressing tube part in the axial direction; and
a diameter of each of the first inclined part and the second inclined part decreases toward the pressing tube part in the axial direction.

3. The vehicular washing device according to claim 1, wherein an urging spring that urges the pressing tube part in a diameter decreasing direction is provided.

4. The vehicular washing device according to claim 3, wherein a leaf spring wound around an outer peripheral surface of the pressing tube part is used as the urging spring.

5. The vehicular washing device according to claim 1, wherein the shaft is integrally formed in the flow passage forming body.

6. A vehicular washing device comprising:
a nozzle that sprays a fluid toward an object to be washed;
a joint of which an internal space is a flow passage of the fluid and to which a supply pipe is coupled, the supply pipe being supplied with the fluid;
a valve that opens and closes the flow passage, and
an urging spring that urges the valve in a direction of closing the flow passage and is located inside the valve; wherein
the valve is disposed inside the joint, and
the fluid flows outside the valve.

7. The vehicular washing device according to claim 6, wherein:
a nozzle holder that holds the nozzle is provided; and
the joint is attachable to and detachable from the nozzle holder.

8. The vehicular washing device according to claim 7, wherein:
the joint is provided with a coupling tube part that is coupled to the nozzle holder and a pipe coupling part to which the supply pipe is coupled; and
an axial direction of the coupling tube part and an axial direction of the pipe coupling part are different directions.

9. The vehicular washing device according to claim 8, wherein:

the joint is provided with an elastically deformable coupling protrusion; and the joint is attached to the nozzle holder as a portion of the coupling protrusion is engaged with the nozzle holder.

10. A vehicular washing device including a nozzle that sprays a fluid toward an object to be washed and a flow passage forming body of which an internal space is a flow passage of the fluid, the flow passage having a first direction in which the fluid heads for the nozzle and a second direction that is the opposite direction from the first direction, the vehicular washing device comprising:

a valve seat that has an opening and is movable in the first direction and the second direction;

a valve that is movable in the first direction and the second direction and opens the opening by moving in the first direction under a pressure of the fluid flowing in the first direction;

a first spring that urges the valve seat in the first direction and presses the valve seat against the valve; and a second spring that urges the valve in the second direction and closes the opening with the valve.

11. The vehicular washing device according to claim 10, wherein an urging force of the first spring is larger than an urging force of the second spring.

12. The vehicular washing device according to claim 10, wherein an O-ring that is located around the valve and restricts a flow of the fluid from an outer peripheral side of the valve seat toward an outer peripheral side of the valve is provided.

13. The vehicular washing device according to claim 10, wherein a flow groove extending in a flow direction of the fluid is formed in an inner surface of the flow passage forming body, on an outer peripheral side of the valve seat.

14. The vehicular washing device according to claim 10, wherein coil springs are used as the first spring and the second spring.

* * * * *